April 16, 1963 D. R. FIEDLER 3,085,520
MACHINE FOR PRODUCTION OF FROZEN CONFECTIONS
Filed July 3, 1961 16 Sheets-Sheet 1

INVENTOR.
Dean R. Fiedler
BY
Attys.

April 16, 1963     D. R. FIEDLER     3,085,520
MACHINE FOR PRODUCTION OF FROZEN CONFECTIONS
Filed July 3, 1961     16 Sheets-Sheet 2

INVENTOR.
Dean R. Fiedler
BY *Wells & St. John*
Attys.

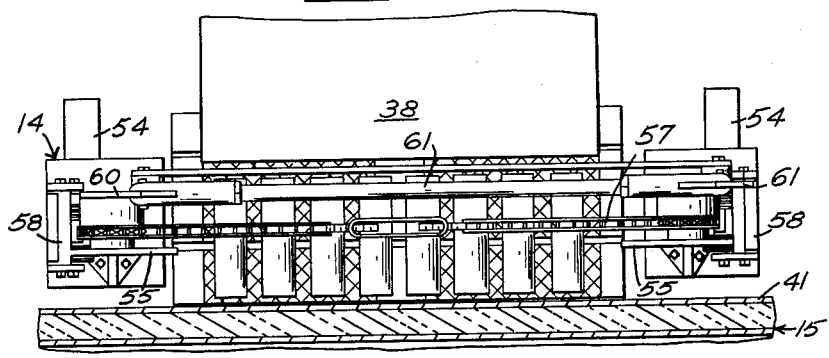
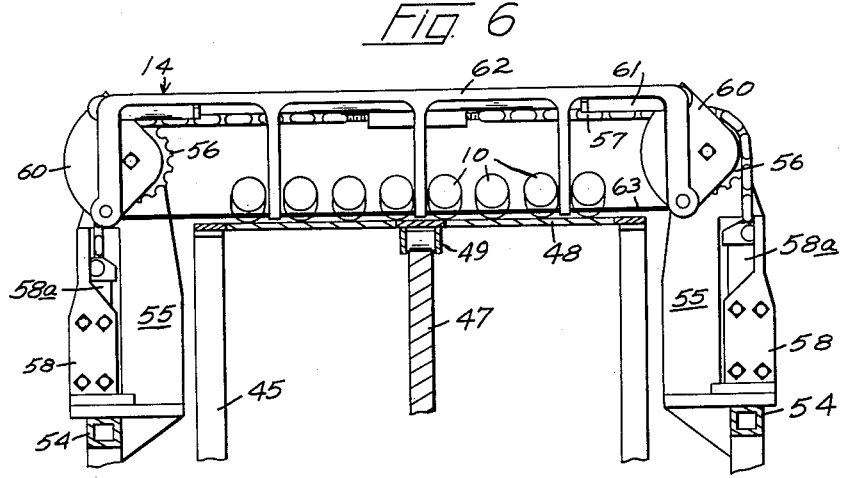
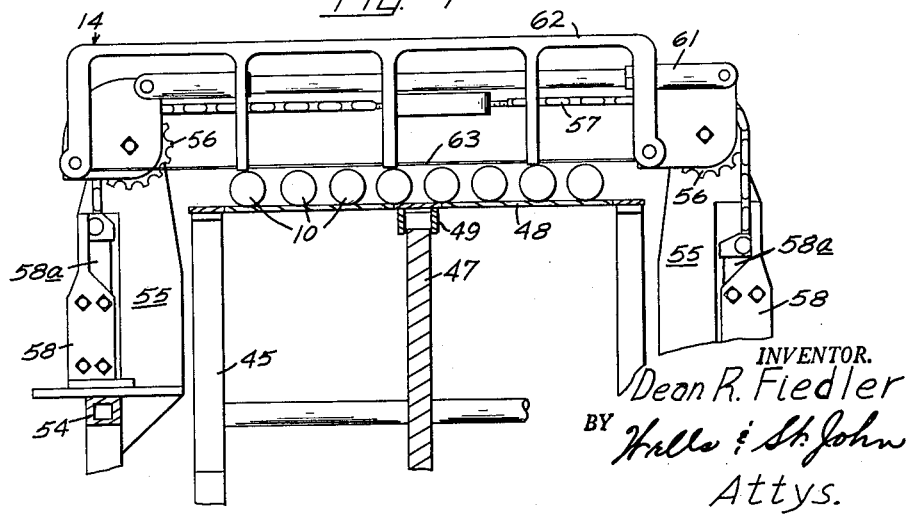

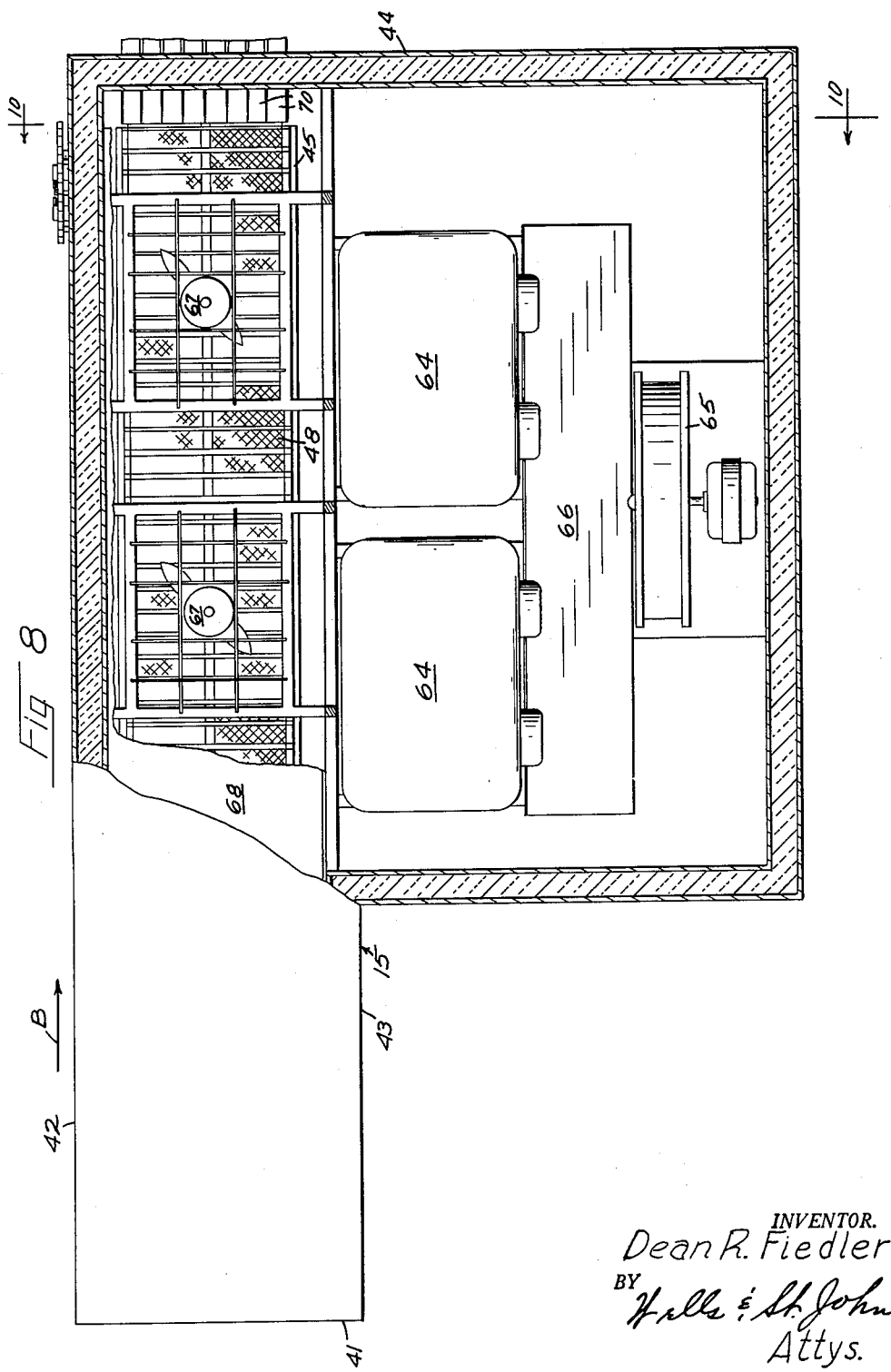

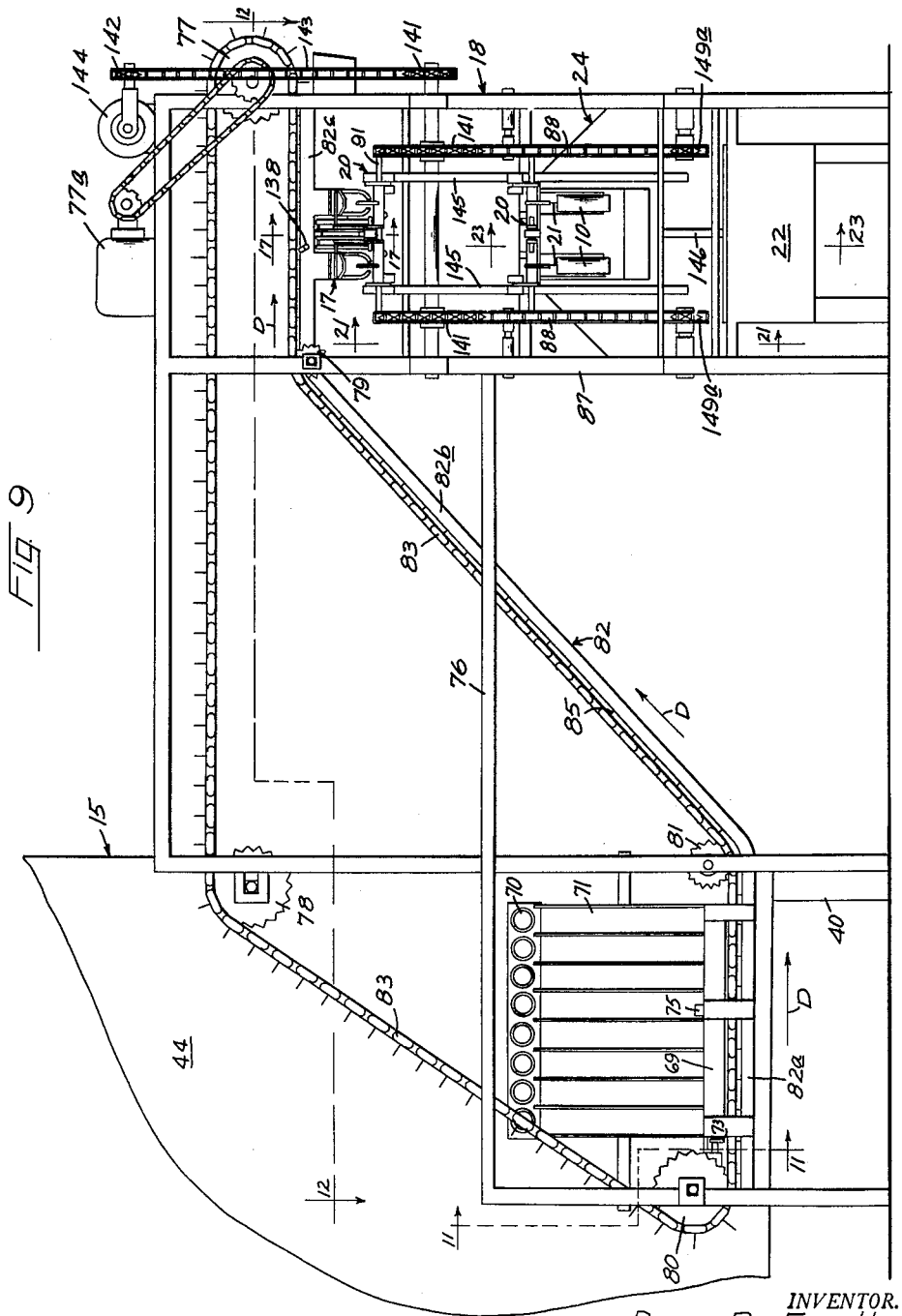

April 16, 1963   D. R. FIEDLER   3,085,520
MACHINE FOR PRODUCTION OF FROZEN CONFECTIONS
Filed July 3, 1961   16 Sheets-Sheet 6
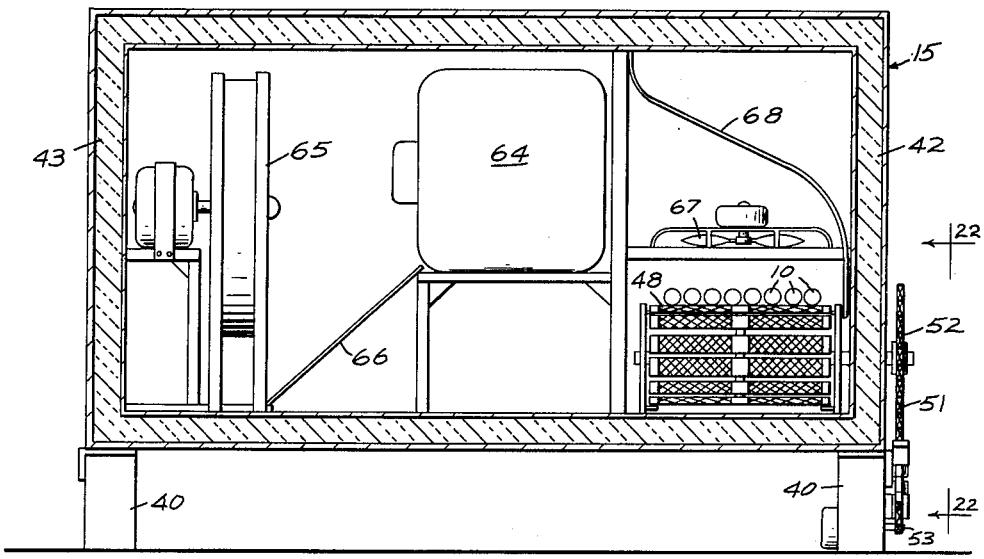
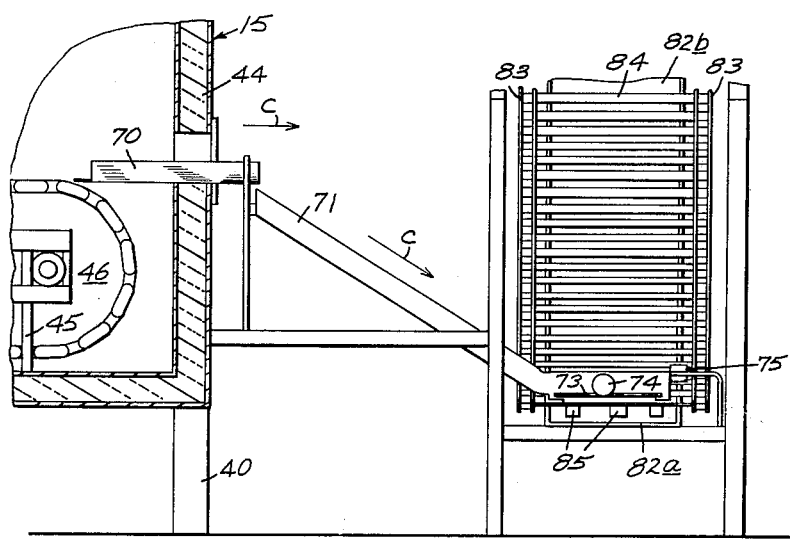
INVENTOR.
Dean R. Feidler
BY Wells & St. John
Attys.

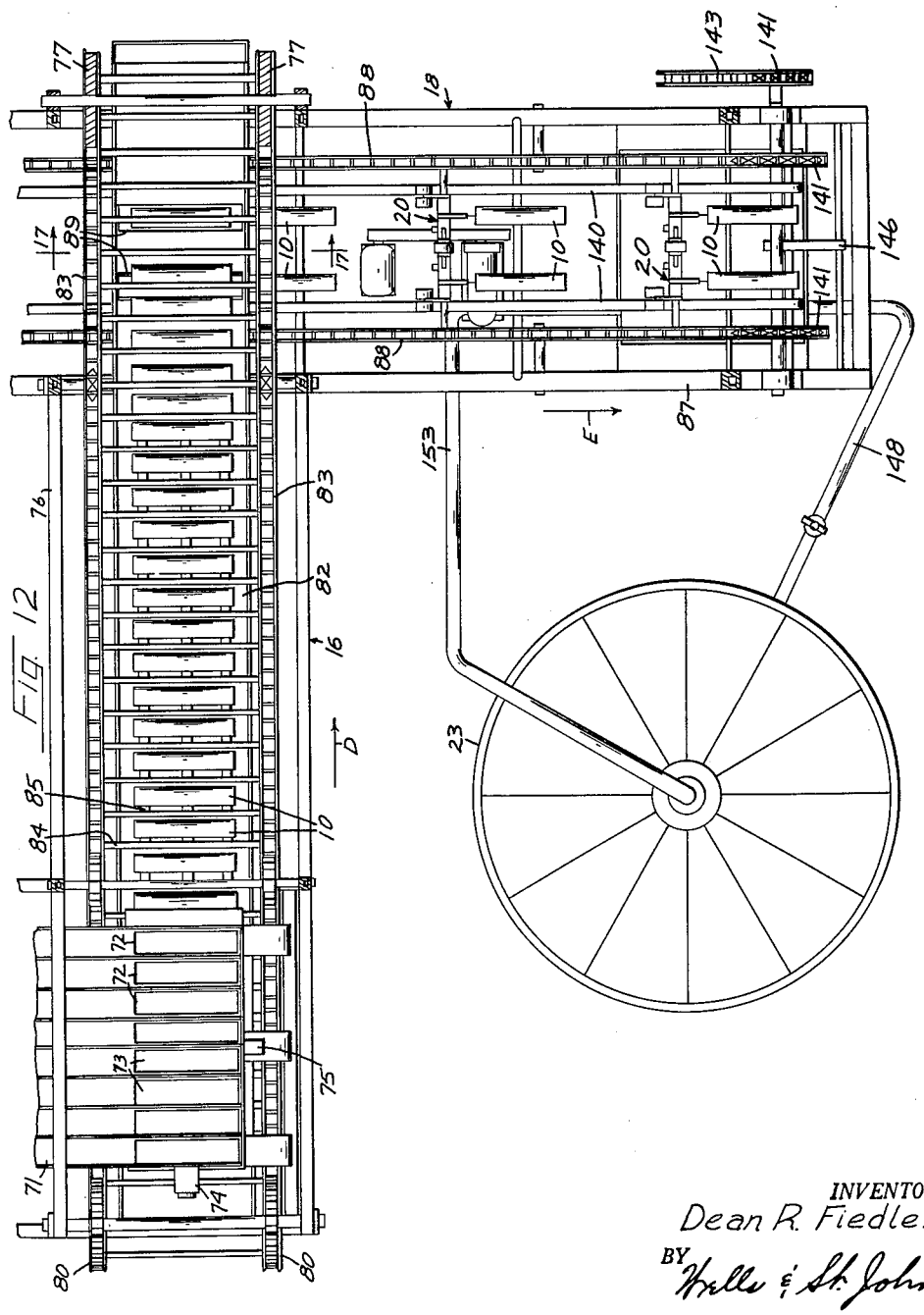

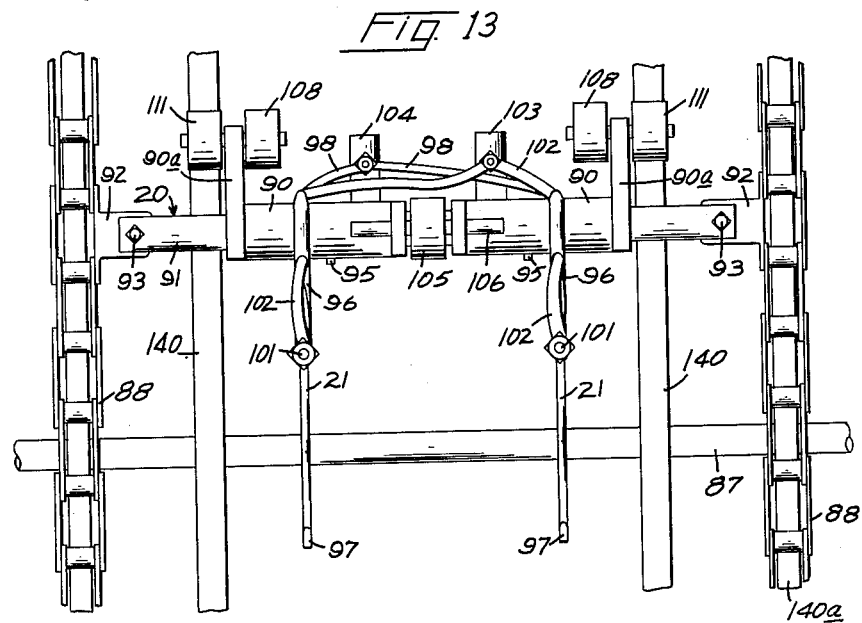
Fig. 13
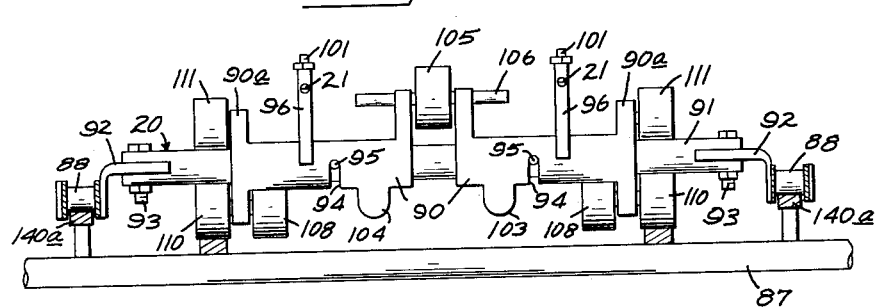
Fig. 14
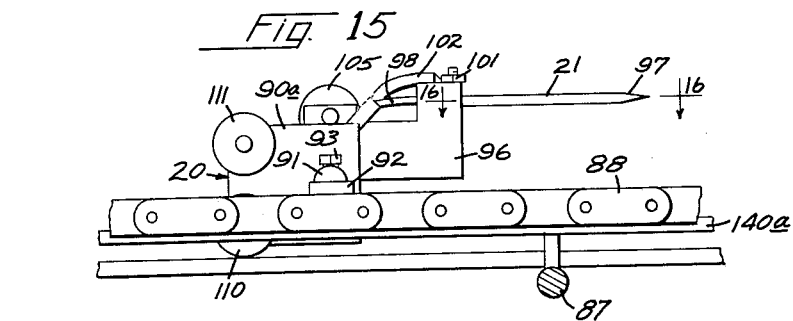
Fig. 15
Fig. 16
INVENTOR.
Dean R. Fiedler
BY Wells & St. John
Attys.

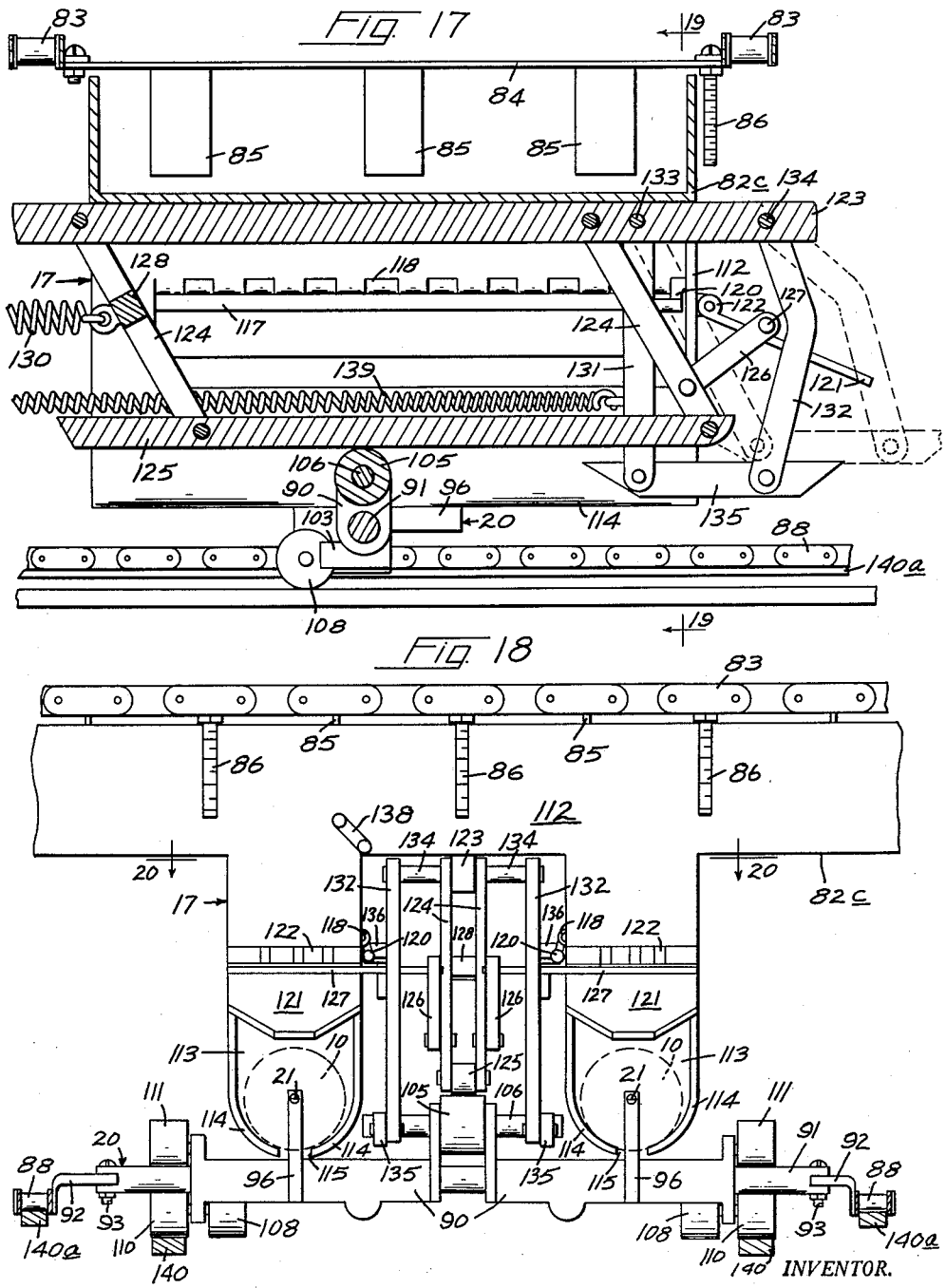

INVENTOR.
Dean R. Fiedler

April 16, 1963 D. R. FIEDLER 3,085,520
MACHINE FOR PRODUCTION OF FROZEN CONFECTIONS
Filed July 3, 1961 16 Sheets-Sheet 11

INVENTOR.
Dean R. Fiedler
BY Wells & St. John
Attys.

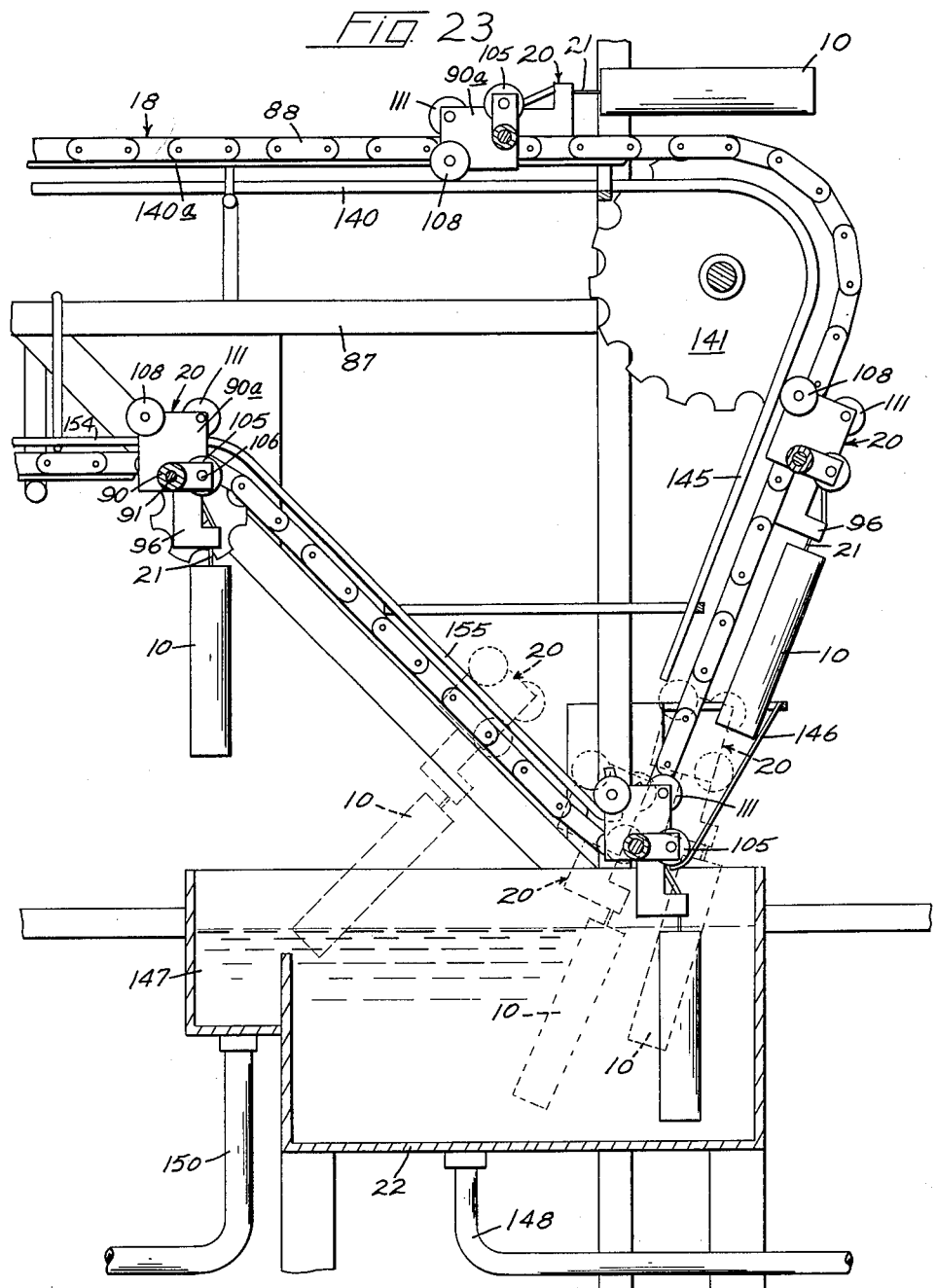

April 16, 1963  D. R. FIEDLER  3,085,520
MACHINE FOR PRODUCTION OF FROZEN CONFECTIONS
Filed July 3, 1961  16 Sheets-Sheet 13
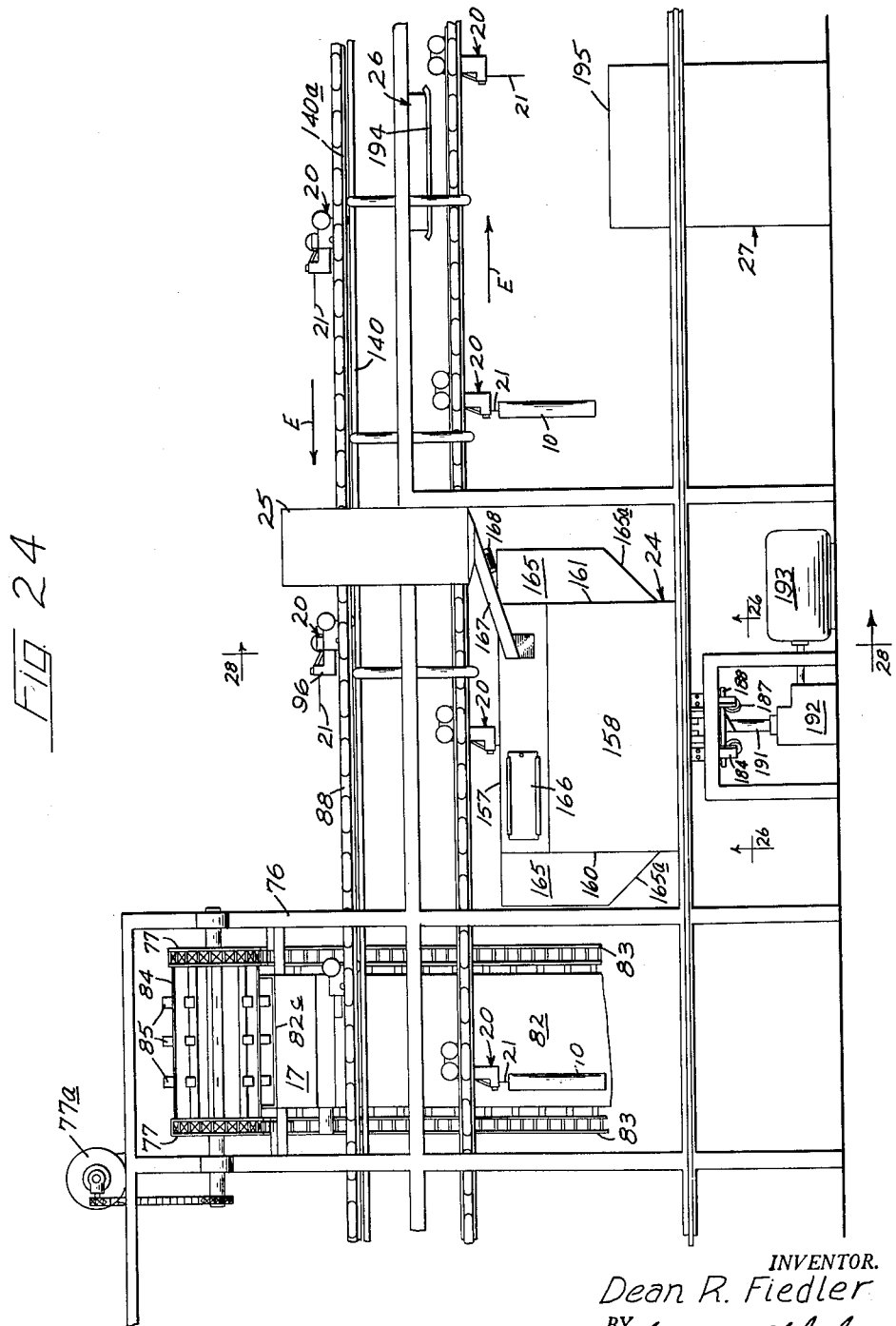
INVENTOR.
Dean R. Fiedler
BY Wells & St. John
Attys.

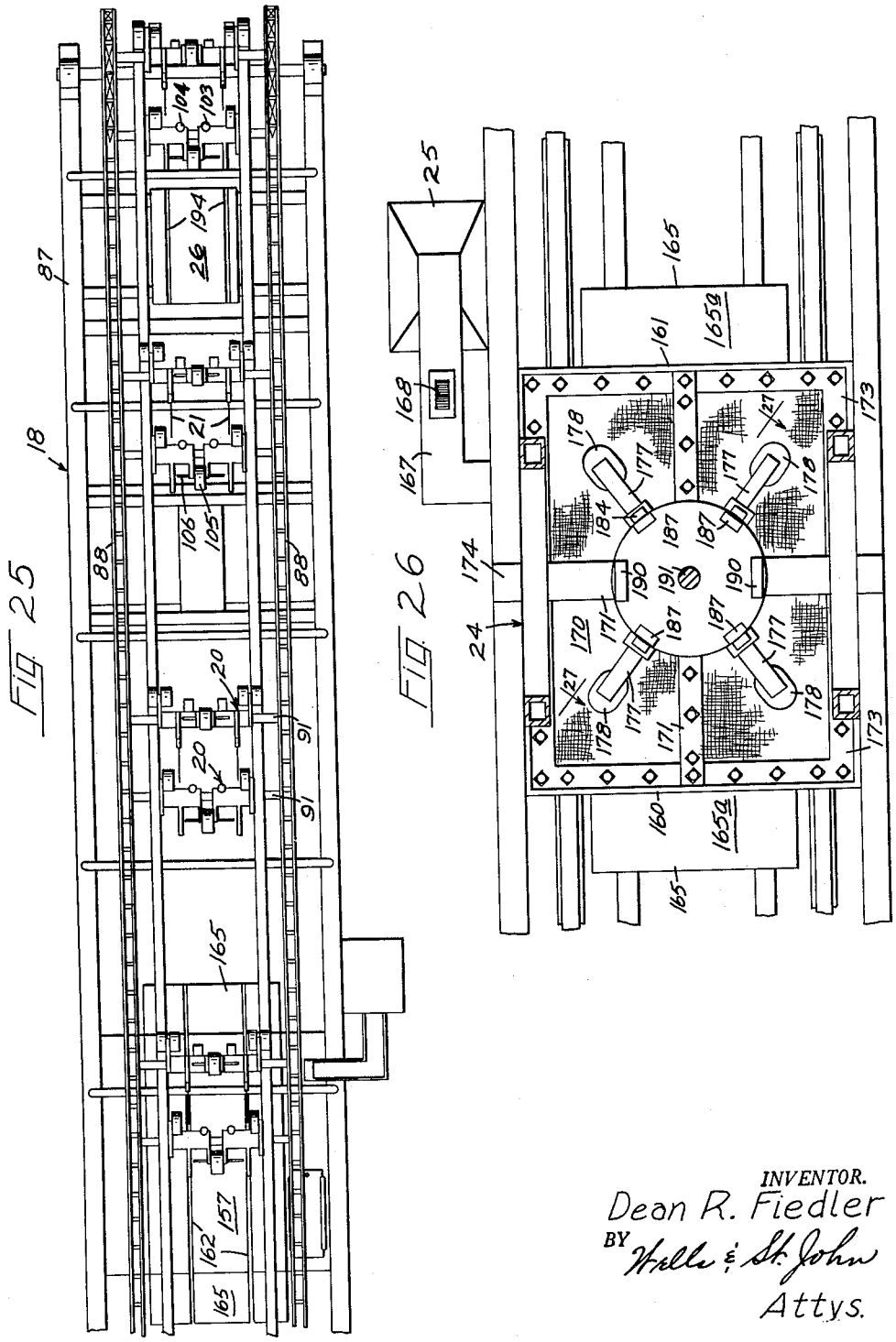

April 16, 1963 D. R. FIEDLER 3,085,520
MACHINE FOR PRODUCTION OF FROZEN CONFECTIONS
Filed July 3, 1961 16 Sheets-Sheet 15
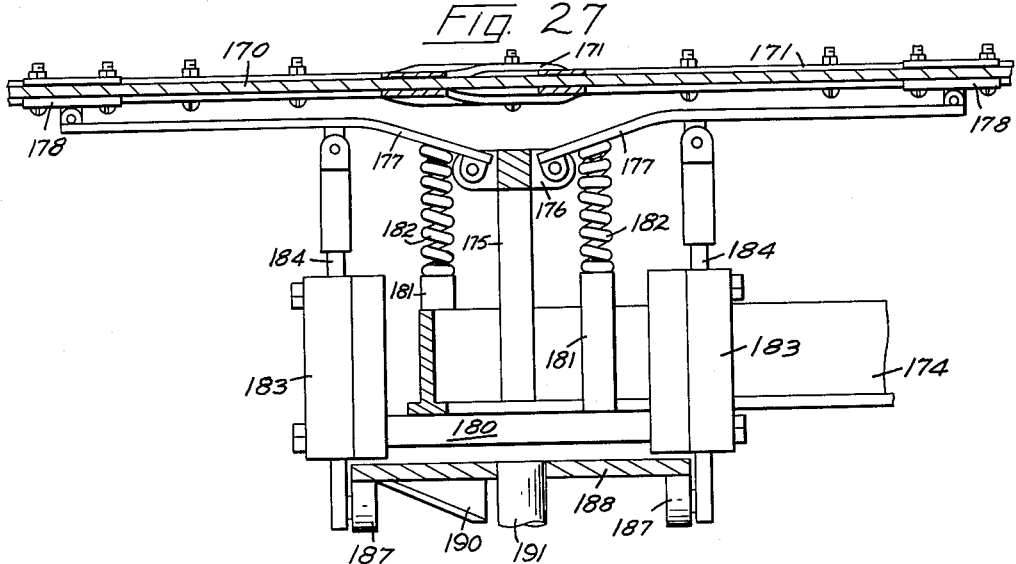
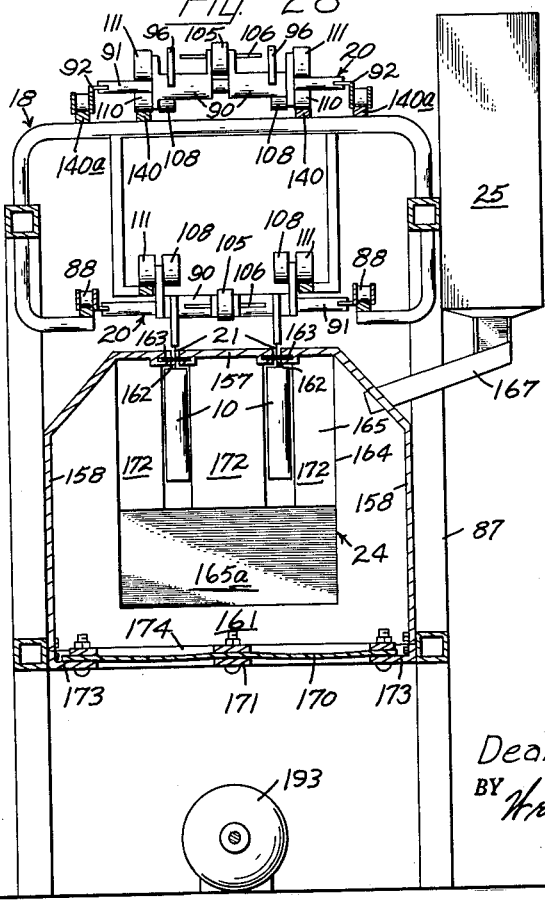
INVENTOR.
Dean R. Fiedler
BY Wells & St. John
Attys.

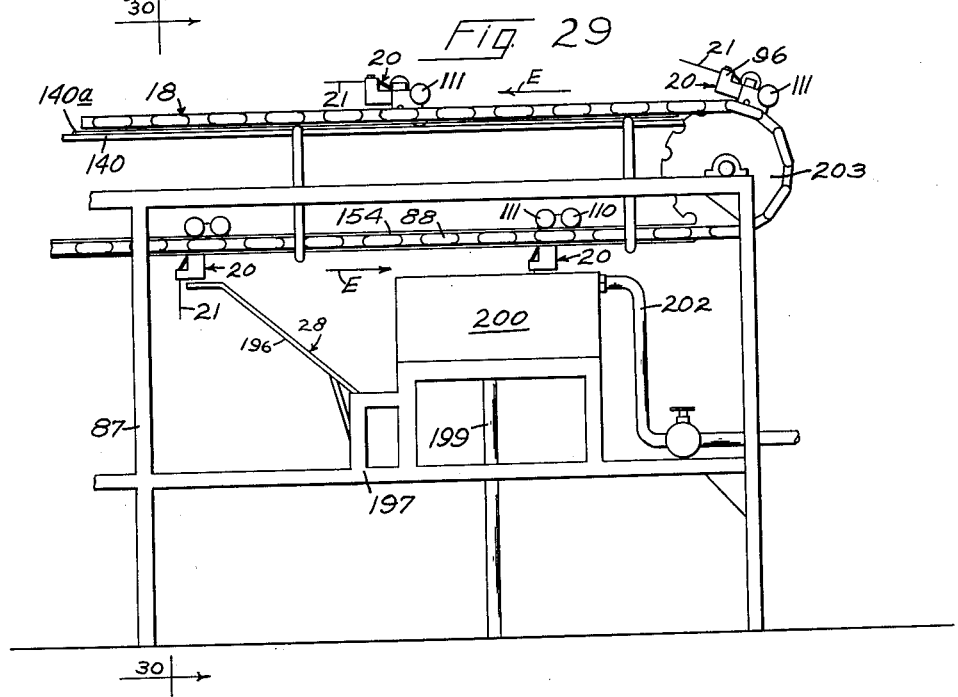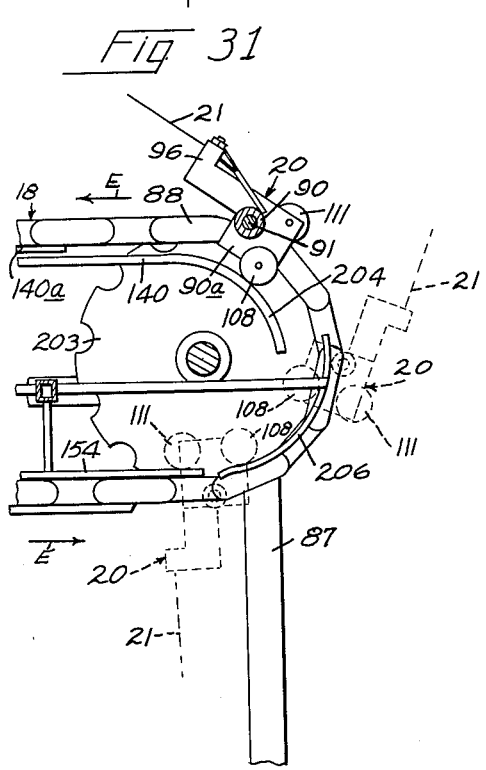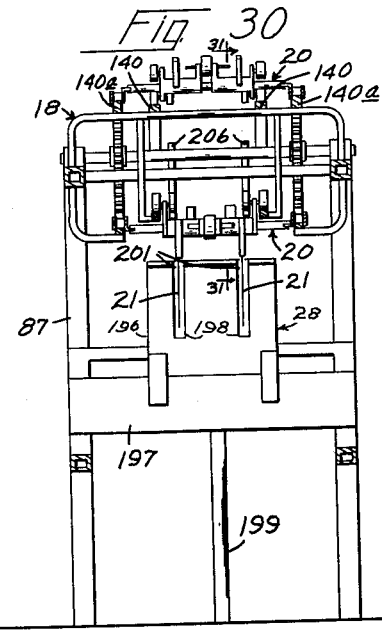

United States Patent Office 3,085,520
Patented Apr. 16, 1963

3,085,520
MACHINE FOR PRODUCTION OF FROZEN
CONFECTIONS
Dean R. Fiedler, 9402 SE. 46th Court, Portland 22, Oreg.
Filed July 3, 1961, Ser. No. 121,733
8 Claims. (Cl. 107—8)

This invention relates to a novel machine designed to automatically produce frozen confections.

The machine described in the following disclosure is specifically designed to automatically manufacture frozen confections comprising a cylinder of frozen milk or ice cream coated with a chocolate covering and finally covered with crumbs or other particles. Up to the present time such confections have been produced by rather slow semi-automatic machinery. The many operations required were carried out in separate machines. The instant machine is designed specifically to produce such confections in one continuous operation. The raw materials are fed into the machine in the state in which they may be purchased and the final frozen product is bagged and ready for shipment at the completion of each cycle through the machine.

It is a first object of the present invention to provide a high capacity machine for the mass production of cylindrical frozen confection logs. This machine as described is integrated with a common slushing apparatus and a conventional bagging machine designed to protect the final log products. The entire apparatus utilizes a continuous flow of materials from the raw material state to the final product state.

It is another object of this invention to provide a unique freezing tunnel designed to supply a continuous conveyor with frozen, solid cylinders for later steps in the production of such frozen confection logs. This tunnel is designed to receive extruded semi-frozen material and to freeze this material quickly during the transfer of the material from an extruder to an operating conveyor network.

It is another object of this invention to provide a compact arrangement of components utilized to form the overall operating network. In order to accomplish this end the conveyors are located adjacent one another with a transverse transfer conveyor connecting the two main conveyor assemblies. In order to further accomplish such a compact arrangement two levels of operation are utilized, the upper level being the one described specifically in the following disclosure.

A most important object of the present invention is to provide a unique carrier utilizing axial needles on which the individual cylinders are impaled for mounting purposes during the operations in which the cylinders are coated. The needle used to hold each cylinder is designed so as to be quickly heated by electrical resistance to thereby remove the bars when the operations are completed. The carrier is designed specifically to co-act with the operating conveyor assembly so as to hold the cylinders in their proper orientation for each coating operation and for loading purposes while the cylinders are being impaled on the needles.

It is another object of this invention to provide a unique operating conveyor assembly designed to cooperate with the needle carriers which hold the cylinders so as to properly orient each cylinder for each operation of the coating apparatus. In particular, this conveyor is designed to provide a quick angular movement of the cylinders for dipping in a chocolate bath so as to minimize the side forces on the frozen cylinder during the entering of the liquid chocolate while removing the dipped cylinders from the chocolate in as quick a motion as is practical.

It is another object of this invention to provide an effective loading hopper designed to hold individual forms during their impalement on the needles and in this regard the hopper gates are controlled entirely by the carrier on which the cylindrical forms are being mounted.

It is another object of this invention to provide a mechanical crumber through which the freshly dipped cylindrical forms are passed. The crumber has a unique apparatus built therein designed to provide an atmosphere to which crumbs are continuously projected so that the forms being passed therethrough will be fully coated with the coating particles.

It is another object of this invention to provide the operating conveyor with fixed electrical conductors designed to make electrical contact with the carrier assembly mounting the individual forms so as to thereby heat the needles holding the forms by electrical resistance and to cause the frozen forms to be released from the carrier.

Another object of this invention is to prevent the fouling of the machine by a retained frozen form after heating of the needles by providing a stripper at the subsequent operating point. The stripper is designed to remove forms which might accidentally remain on a needle after the form should have been dismounted and is preferably mounted directly before a washing apparatus in which the needles are prepared for subsequent mounting of another set of frozen cylindrical forms.

These objects and others will be evident from a study of the following description taken in conjunction with the accompanying drawings which fully illustrate one complete apparatus built according to the concepts embodied in this invention. It is to be understood that this machine as shown in the drawings is merely illustrative and is not intended to restrict or limit the scope of the invention except as that scope may be defined in the following claims.

In the drawings:

FIGURE 5 is a top view of the cutting apparatus shown on an enlarged scale and taken along line 5—5 in FIGURE 2;

FIGURE 6 is an elevational view of the cutting apparatus shown in FIGURE 5 as seen along line 6—6 in FIGURE 2 at an enlarged scale;

FIGURE 7 is a view similar to FIGURE 6 showing the cutting apparatus in a second extreme position;

FIGURE 8 is a top view of the freezing tunnel with a portion of the top wall broken away in section, and with a portion of the air deflectors broken away to show the fan and conveyor structure;

FIGURE 9 is an end view of the apparatus looking toward the end of the freezing tunnel shown at the right in FIGURE 8, with a portion of the tunnel broken away and the transfer conveyor being shown in side elevation;

FIGURE 10 is a sectional view through the freezing tunnel as seen along line 10—10 in FIGURE 8;

FIGURE 11 is a sectional view of the exit end of the freezing tunnel and the elevating conveyor as seen along line 11—11 in FIGURE 9;

FIGURE 12 is a sectional view of the transfer conveyor and operating conveyor as seen along line 12—12 in FIGURE 9;

FIGURE 13 is a top view of a single needle carrier riding along the upper flight of the operating conveyor;

FIGURE 14 is a front view of the carrier shown in FIGURE 13;

FIGURE 15 is a side elevational view illustrating the carrier shown in FIGURE 13;

FIGURE 16 is an enlarged sectional view taken through a single needle along the line 16—16 in FIGURE 15;

FIGURE 17 is an enlarged vertical sectional view taken through the center of the hopper mechanism along line 17—17 in FIGURE 12;

FIGURE 18 is a front end view of the hopper assembly seen in FIGURE 17;

FIGURE 23 is another sectional view through the dipping end of the operating conveyor as seen along line 23—23 of FIGURE 9 with intermediate positions of the forms and carrier being shown in dashed lines;

FIGURE 24 is a side elevation view of the operating conveyor as the conveyor would be seen from its outer side with the dipping portion being broken off at the left hand end and the cleaning mechanism being broken off at the right hand end;

FIGURE 25 is a top view of that portion of the operating conveyor shown in FIGURE 24, and further including the entire right hand end of the conveyor;

FIGURE 26 is a view of the crumber apparatus taken on an enlarged scale along line 26—26 in FIGURE 24;

FIGURE 27 is a view on a still enlarged scale taken along line 27—27 in FIGURE 26;

FIGURE 28 is a sectional view taken along line 28—28 in FIGURE 24;

FIGURE 29 is a side elevation view of the cleaning portion of the operating conveyor and is a continuation of the right hand end of FIGURE 24;

FIGURE 30 is a sectional view of the operating conveyor taken along line 30—30 in FIGURE 29; and FIGURE 31 is an enlarged sectional view through the final end of the operating conveyor as seen along line 31—31 in FIGURE 30.

Figure 1:
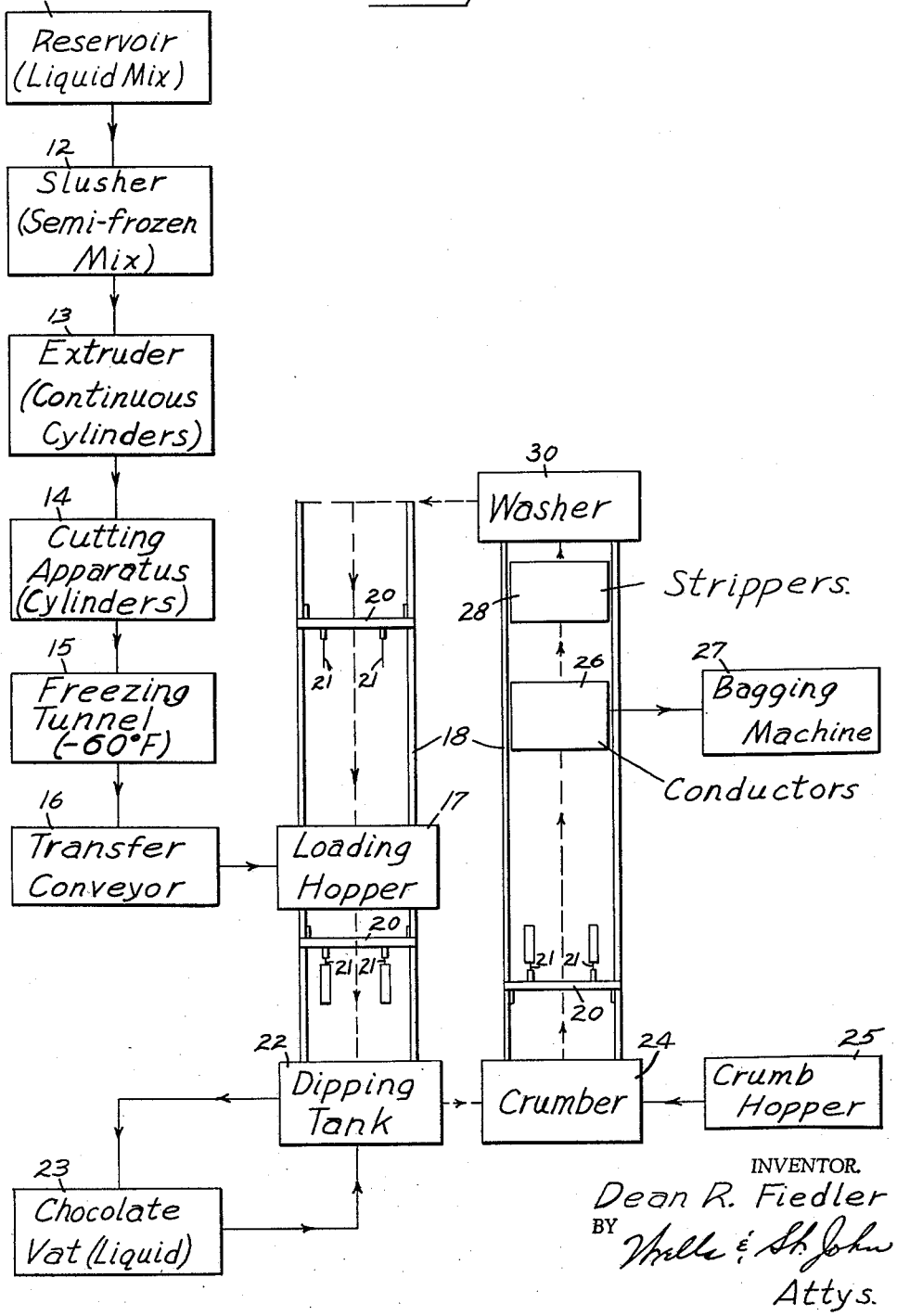
FIGURE 1 is a schematic flow diagram illustrating the entire apparatus and the steps involved in the production of frozen confection logs according to the present invention.

Since the machine described in the following disclosure is quite complex and cannot be fully illustrated on a single sheet of drawings it may be useful to first generally describe the process being utilized, and the general components of the machine which carry out this process. This machine is particularly designed to automatically produce frozen confection logs having a cylindrical form of frozen milk or ice cream coated with a substance such as chocolate and covered with articles such as crumbs or crushed nuts. In order to produce such a confection in mass quantities the totally integrated apparatus to be described was devised. The apparatus utilizes thus a first raw material, a liquid mix which may be a milk or cream substance of the desired content for later freezing. This liquid mix may be stored in any suitable reservoir, such as that designated by the numeral 11 in the schematic flow diagram shown in FIGURE 1. The structure of the reservoir and the substance included for use in the final product are not crucial to the instant invention and form no particular part thereof. Therefore this reservoir itself will not be described herein since such assemblies are available commercially and are in widespread use. The liquid mix is first transferred to a slusher 12, diagrammatically shown in FIGURE 1. The slusher cools the mix and provides a semi-frozen product which is transferred to an extruder apparatus 13. The slusher machine is another conventional component and forms no part of the instant invention.

General Description

The extruder apparatus 13 is the first component of the machine which is fully shown in the accompanying drawings. The extruder 13 compacts the semi-frozen mix supplied from the slusher 12 and pushes this mix under pressure through a series of dies designed to form continuous cylinders of the semi-frozen material. These continuous cylinders are periodically cut by a cutting apparatus 14 which deposits the cut cylinders within a freezing tunnel 15. The tunnel 15 is provided with a suitable continuous conveyor which moves the cylinder along the length of the tunnel in an atmosphere maintained at a temperature sufficiently cold to insure complete freezing of the cylinders before their exit from the tunnel 15. The cylinders are then placed upon a transfer conveyor 16 which moves the cylinders transversely to an operating conveyor 18. The operating conveyor 18 is provided with a series of spaced carriers 20, each of which has mounted thereon a pair of needles 21. The needles 21 are designed to impale the cylinders individually along their central cylinder axes. Transfer of the cylinders from the conveyor 16 onto the needles 21 is accomplished by means of a loading hopper 17, mounted directly above the operating conveyor 18. When mounted upon the needle 21 the cylinders are progressively carried by the operating conveyor to a dipping tank 22 which is provided with liquid chocolate from a storage vat 23. The freshly dipped cylinders then pass through a crumber 24 which deposits particles thereon. The crumber 24 is supplied with crumbs stored in a hopper 25. The needles 21 are then heated by means of conductors 26 mounted above the operating conveyor 18, the conductors 26 being adapted to contact electrical bars wired to the individual needles. The cylinders then drop into a bagging machine 27 which individually wraps each of the completed confections for consumer purchase. The bagging machine again is a conventional component and forms no part of the instant invention. Before passing through a washer 30, the needles 21 must pass a stripper 28 which is designed to automatically remove forms remaining on one of the needles 21. The washer 30 sterilizes and cleans the needles 21 which then return to the hopper 17 for subsequent loading and repetition of the operating cycle. Thus the machine utilizes a complete process whereby raw materials are fed into the various components and a final wrapped product is produced in mass quantities automatically without human intervention.

In the specific machine shown in the remaining drawings, the parts schematicaly illustrated in FIGURE 1 are shown in a very compact arrangement. The reservoir and slusher 11 and 12 may be located at a remote position or at an upper or lower level relative to the operating network of conveyors. The remaining portions of the machine are preferably located on a single floor, although this is subject to wide variance depending upon the floor area available and the requirements of each individual installation. The bagging machine 27 is preferably located at a lower level so as to receive the confections as they drop from the heated needles 21 under the conductors 26. In order to more firmly fix this pattern a brief analysis of the drawings and their interrelation may be helpful.

Figure 2:
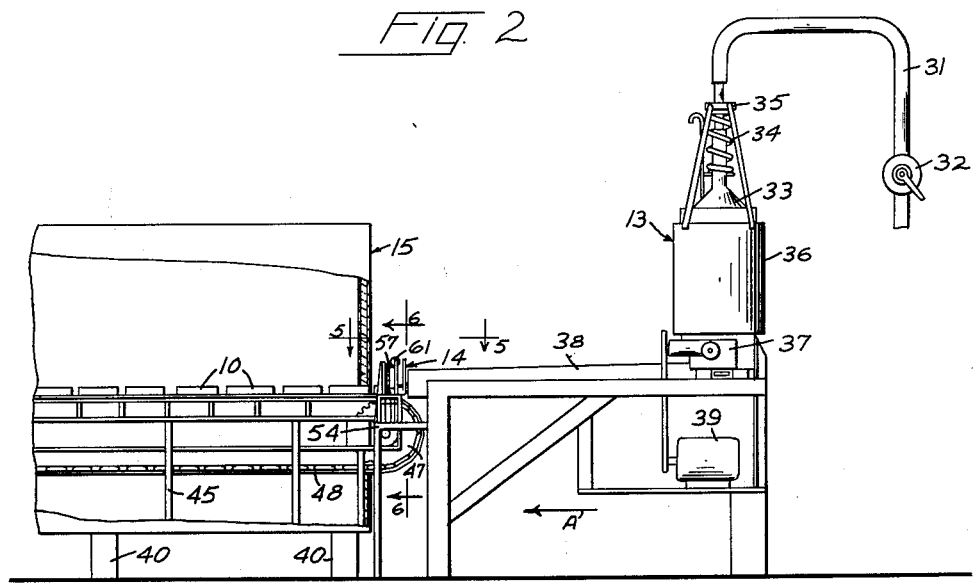
FIGURE 2 is a side view of the extruding and tunnel apparatus with the side wall of the tunnel broken away so as to show the interior conveyor and cutting apparatus.
Figure 3:
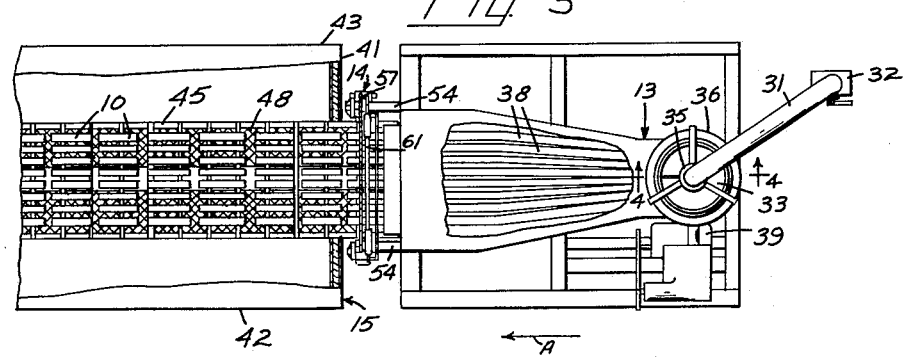
FIGURE 3 is a top view of the assembly shown in FIGURE 2, with a portion of the extruder apparatus broken away and with the top wall of the tunnel broken away.
Figure 4:
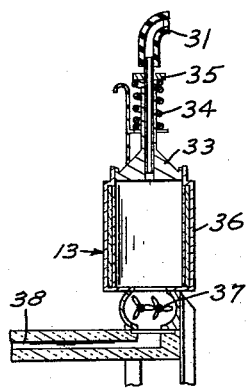
FIGURE 4 is a sectional view of the extruding tank and pump taken along line 4—4 in FIGURE 3.
Figure 21:
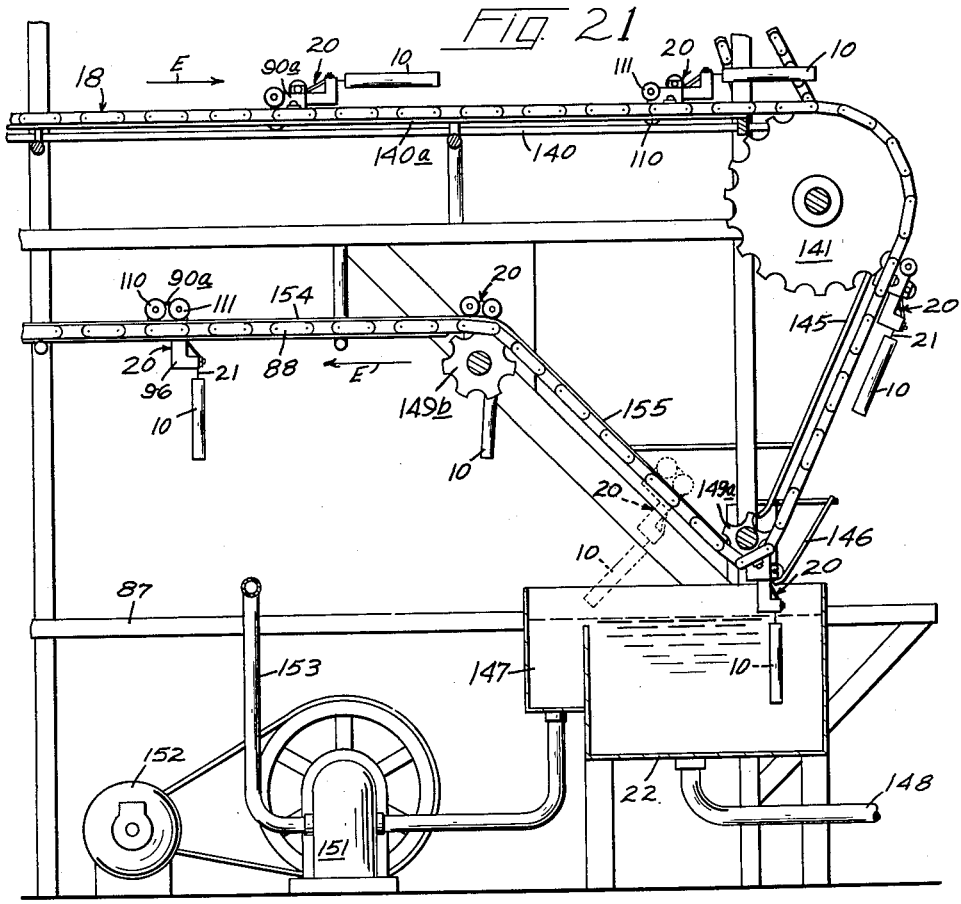
FIGURE 21 is an enlarged vertical section view through the dipping portion of the operating conveyor taken along line 21—21 in FIGURE 9.

The initial operation specifically described in the following description is that which takes place at the extruder 13. The extruder 13 is shown in FIGURES 2 through 4 and movement of the material takes place in the direction designated by the arrows A in FIGURES 2 and 3. The cut cylinders then pass through the freezing tunnel shown in FIGURE 8, the direction of flow being designated by the arrow B. The frozen forms then move along a chute shown in FIGURE 11, the direction of movement being illustrated by arrows C. The forms are then carried by the traverses conveyor 16 in the direction illustrated by arrows D in FIGURES 9 and 12. From the transfer conveyor 16 the forms are loaded by the hopper 17 onto the carrier 20 and moved along the operating conveyor 18 in the direction illustrated by arrows E. The dipping portion of the operating conveyor is illustrated in FIGURES 21 and 23, taken from the inner side of the conveyor. The remaining parts of the operating conveyor are shown from the outer side thereof and are illustrated in FIGURES 24 and 29 in elevational side views which fit one onto the other. The interrelation of these various parts will be more fully understood from the detailed description of each component.

Cylinder Forming Components

Figure 22:
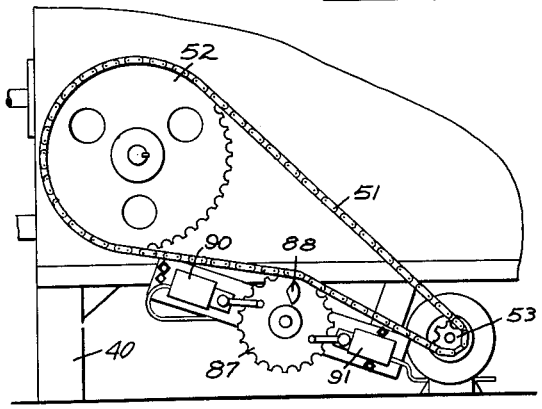
FIGURE 22 is an enlarged view of the control mechanism for the cutting apparatus as seen along line 22—22 in FIGURE 10.

The first pertinent component of the instant invention is the extruder apparatus 13. This portion of the machine can be seen in FIGURES 2 through 4. The extruder 13 is provided with a delivery intake pipe 31 through which the semi-frozen mix is transferred from the slusher 12. The delivery pipe 31 includes a suitable conventional valve 32 designed to regulate and restrict movement of the mix to the extruder 13. The extruder 13 includes a container 36 of insulated material in which is seated a plunger 33 biased downwardly by a spring 34 mounted against a back stop 35, fixed relative to the container 36. The spring 34 exerts a constant pressure upon the mix in the otherwise open container 36. The lower part of the container 36 opens to a conventional pump 37 which is driven by a motor 39. The pump 37 forces the semi-frozen mix through a series of parallel die tubes 38 which open to the interior of the freezing tunnel 15. The tunnel 15 is an insulated structure designed to be maintained at a very cold temperature. It is mounted upon supports 40 and includes a rear wall 41, a pair of side walls 42—43 and a front wall 44. Throughout this specification the terms "front" and "rear" will be used relative to the movement of the material being processed by the component being described. Thus the rear wall 41 and the front wall 44 are located relative to the movement of the cylinders 10 which are carried along the tunnel conveyor. This conveyor consists of a rigid frame 45 mounted within the confines of the tunnel 15 and extending longitudinally therein. The conveyor utilizes a central drive sprocket 46 mounted near the exit end of the tunnel 15. The rear end of the conveyor is provided with an idler sprocket 47. The two sprockets 46 and 47 are joined by a central chain 49 which carries a screen belt 48. The continuous belt 48, made of mesh segments of screen, is designed to allow the free flow of circulating air about the cylinders 10 carried thereon. The drive sprocket 46 is powered by an outside mechanism shown in FIGURE 22. This mechanism includes a large sprocket 52 which is driven by a smaller driving sprocket 53 by means of a chain 51. The timing of the conveyor within the freezing tunnel 15 is controlled relative to the movement of the semi-frozen material through the die tubes 38 within the extruder apparatus 13. The movement of the belt 48 is slightly faster than that of the semi-frozen mass within the tubes 38. In order to cool the interior of the tunnel 15 there are provided a pair of evaporators 64 and a large circulating fan 65 directed transversely to the direction of movement of the belt 48. Air circulated by these units is deflected by a lower deflector 66 through the evaporators 64 and by upper deflectors 68 to vertical circulating fans 67 mounted directly above the belt 48. See FIGURES 8 and 10. Thus a continuous circulation of cool air is provided from the evaporators 64 to the fans 67 through the area of the belt 48 back again to the transverse circulating fan 65. This arrangement insures an effective circulation of air past each cylinder 10 as it traverses the length of the belt 48. The semi-frozen mass deposited upon the rear end of the belt 48 is rigidly frozen during this passage through the tunnel 15. The temperature within the tunnel 13 may be adjusted to any desired level. A suitable operating level has been found to be −60 degrees F.

It is to be observed from the drawings that the semi-frozen mix is not deposited upon the belt 48 in a continuous form but in the form of individual cylinders. In order to insure the proper formation of these cylinders a very accurate cutting mechanism is required. The cutting apparatus is shown in FIGURES 2 and 3 and is shown in detail in FIGURES 5 through 7. It is mounted astride the top flight of the belt 48 on which the cylindrical forms are to be deposited. It is also mounted rearwardly adjacent the rear wall 41 of the tunnel 15 and directly adjacent the exit surfaces of the die tubes 38. The cutting apparatus 14 includes a pair of side supports 54 fixed relative to conveyor frame 45. Mounted on the supports 54 are a pair of pedestals 55 which extend above the top surface of the belt 48. The pedestals 55 rotatably support a pair of sprockets 56 across the top of which is entrained a chain 57. The outer ends of the chain 57 are fixed to the movable elements of a pair of controlling solenoids 58. The solenoids 58 are of the type designed to pull their movable elements 58a in a downward direction when the solenoids 58 are respectively actuated. The solenoids 58 therefore can pull the chain 57 to one side or the other and thereby rotate the sprockets 56 in one direction or the other about their respective rotational axes. Such rotation will be solely under the control of the two solenoids 58.

The actual cutting element is controlled by a pair of arcuate side plates 60 mounted for rotation respectively with the two sprockets 56. The side plates 60 are also carried by the pedestals 55. The plates 60 are connected by an idler arm 61 which is positioned in a horizontal plane and which is pivotally connected at each end to the respective plates 60. Also connecting the two side plates 60 is a rigid wire support 62 having downwardly projecting fingers across which is mounted a horizontal wire 63. In effect the elements 60, 61 and 62 form a parallelogram structure and each of these elements is movable in a vertical plane only. Movement of the wire 63 is illustrated in FIGURES 6 and 7. In FIGURE 6, the left hand solenoid 58 has been actuated and the wire 63 has passed through the continuous mix being extruded from the tubes 38. In FIGURE 6 the cut cylindrical forms 10 are shown immediately after being sliced by the action of wires 63. In FIGURE 7 the opposite extreme position of the cutting apparatus 14 is shown wherein the wire 63 is positioned directly above the cut forms 10, located on the upper flight of the moving belt 48. In this figure the right hand solenoid 58 has been actuated and by rotation of the sprockets 56 has shifted the position of the side plates 60 to thereby pull the wire 63 upwardly through the semi-frozen mix. The movement of the wire 63 is utilized to cut the semi-frozen mix on both its upward and downward steps. Thus each of the solenoids 58 is utilized to control the cutting movement of the wire 63 which is merely shifted in a vertical plane at a very fast rate of speed to thereby form the proper cylindrical shape in the forms 10. The movement of the solenoids 58 is directly timed relative to the speed of the belt 48 by means of the mechanism illustrated in FIGURE 22. In this figure is shown the drive mechanism for the belt 48 which has previously been described. A third control sprocket 87 is enmeshed with the driving chain 51. The sprocket 87 has mounted thereon a cam 88 designed to contact a pair of oppositely positioned switches 90—91. The switches 90 and 91 are connected respectively to the two solenoids 58. Thus the solenoids 58 will be alternately actuated by contact of cam 88 with the two switches 90 and 91. The timing of the cutting step relative to the speed of the belt 48 will control the length of the individual cylindrical forms 10. This timing may be adjusted by varying the diameter of the control sprocket 87. Since the instant machine is adapted for mass production of a single type of frozen confection, initial selection of a suitable sprocket 87 should be sufficient for all purposes.

At the end of the belt 28 within the freezing tunnel 15 is located a chute apparatus designed to receive the frozen forms as they complete their travel through the tunnel 15. The chute 71 can be seen in FIGURE 11. The forms are first put through a series of receiving slides 70 which are formed with diverging sides designed to separate the individual rows of frozen cylinders 10. As seen in FIGURE 8 these diverging sides of the slides 70 serve to insure proper separation of the forms 10. The forms 10 then push one another through the slides 70 until they are deposited on the downwardly extending chute 71. The lower horizontal portion of the chute 71 includes a plurality of apertures 72. These apertures 72 are illustrated in FIGURE 12. Each is large enough to receive a single cylindrical form 10. The apertures 72 are covered along their lower surfaces by movable gates 73. The gates 73 are slidable as a unit responsive to a solenoid 74. The solenoid 74 is electrically connected to a microswitch 75 at the bottom end of the chute 71. Microswitch 75 is designed to be actuated by contact of the form 10 with an end plate 69 movably mounted on chute 71. Thus each row of forms 10, as it strikes the end plate 69, will actuate the microswitch 75, which in turn will operate the solenoid 74 to thereby move the gates 73 and open the apertures 72. The apertures 72 are located directly above the receiving portion of a transverse conveyor 16.

*Transfer Conveyor and Operating Conveyor*

The transfer conveyor 16 is located transversely to the longitudinal direction of the freezing tunnel 15 and at the exit end thereof. It is provided with a rigid frame 76 upon which the conveyor components are mounted. The transfer conveyor structure can best be seen in FIGURES 9 and 12. The conveyor utilizes a pair of drive sprockets 77 positioned at the upper end of the conveyor. The drive sprockets 77 operate a pair of spaced side chains 83 which are enmeshed with the sprockets 77. The chains 83 are wrapped about upper idler sprockets 78, lower idler sprockets 80, smaller lower idler sprockets 81 and other idler sprockets 79 located below the chains 83 to form a horizontal slide leading to the lower edge of the driving sprockets 77. The chains 83 are directed parallel to and directly above a solid pan 82. This pan 82 includes a lower horizontal area 82a extending directly below the apertures 72 in chute 71. The pan 82 further includes an inclined portion 82b which extends upwardly to an upper horizontal area 82c.

The conveyor structure itself is composed of cross members 84 which are connected across the guide chains 83. These cross members 84 are elevated from the pan 82 and have fixed thereto a plurality of downwardly extending plates 85. The plates 85 are used to push the cylindrical forms 10 along the upper surface of the pan 82 from the lower horizontal area 82a to the upper horizontal area 82c. This conveyor structure can be seen in detail in FIGURES 17, 18 and 19. Mounted along one side of the conveyor directly adjacent one side chain 83, are a plurality of staggered actuating screws 86 which extend downwardly adjacent the outer side surface of the pan 82. The purpose of these actuating screws 86 will be described below. Thus the continuous conveyor system is provided by which the forms 10 are transferred from the freezing tunnel 15 to the operating conveyor 18 on which they are carried during the subsequent operation required to complete the frozen confection log. The timing of the transfer conveyor 16 may be regulated by control of the driving motor and transmission unit 77a, which turns the driving sprockets 77. By utilizing the common electrical controls for all the motors used in the present conveyors, one may insure the proper timing of each conveyor so as to accept the cylinders 10 during the transferring operation. Thus the speed of the transfer conveyor 16 must be such that it can clear the lower horizontal area 82a of the pan 82 each time a row of cylinders 10 is deposited thereon.

The purpose of the transfer conveyor 16 is to move the cylinders 10 transversely to the freezing tunnel to the operating conveyor 18. However, it is possible to vary this conveyor network considerably, depending upon available space requirements. Thus the transfer conveyor 16 may be completely eliminated and an equivalent structure utilized to carry the cylindrical forms 10 to the conveyor 18. A direct connection between the outlet of the freezing tunnel 15 and the operating conveyor 18 is quite possible.

In the specific embodiment shown, the transfer conveyor 16 carries the forms to the conveyor 18 which is mounted on a rigid framework 87. The framework 87 is rigidly connected to the transfer conveyor frame 76 as an integral frame unit. The operating conveyor 18 includes a pair of chains 88 which are spaced from one another and which are of identical construction and which are entrained in parallel flights. The chains 88 are preferably roller chains which can roll along tracks fixed to the framework 87 so as to provide positive support for the chain 88 throughout the length of the respective flights of the conveyor 18.

In order to carry the forms 10 along the length of the operating conveyor 18, specifically designed carriers 20 have been provided. The details of these carriers 20 may be studied in the illustrations shown in FIGURES 13 through 16. Each carrier 20 includes a frame 90. The frame 90 for each carrier 20 includes a pair of mirror image structures which are joined by a central supporting shaft 106 which rotatably journals a central roller 105. Thus the frame 90 is a rigid unit. The frame 90 is carried upon a transverse pivot shaft 91 which extends through a transverse aperture cut through the frame 90. Each end of the pivot shaft 91 is fixed to a mounting bracket 92 which is secured thereto by means of bolts 93. The mounting bracket 92 is an angle bracket which is bent so as to extend upwardly and inwardly from the inner side of the respective chain 88 to which it is fixed. The pivot shaft 91 is freely rotatable within the frame 90. However, motion of the frame 90 relative to the shaft 91 is limited by means of pins 95 which extend through restricting vertical slots 94 cut through the frame 90.

Each portion of the frame 90 includes a vertical needle support 96. The two needle supports 96 are spaced transversely from one another and are identical in all respects. Each support 96 has fixed thereto an outwardly extending needle 21. The needle 21 is a tubular element having a closed and pointed end 97 at its outer extremity. Located within the needle 21 is an interior wire 98 provided with suitable insulation 100. The outer end of the wire 98 is connected to the needle 91 at the pointed end 97. This connection is an electrical connection and is utilized to form a complete resistance unit including the needle structure 21 itself. The needle 21 is electrically connected to a connecting post 101 mounted on the frame 90. Heavy wires 102 are used to connect the post 101 to a first conductive post 103, insulated from the frame 90. A second conductive post 104 is electrically connected to the interior wires 98. Thus the conductive posts 103 and 104 provide parallel connections between the wires 102 and the wires 98 to thereby complete parallel resistance circuits including each of the needles 91. When current is supplied through the post 103 and 104 the wires 98 and the needles 21 will be heated thereby. Due to the use of the low resistance element in the wires 102 this heating will be confined mainly to the needles 21 themselves. Use of a low resistance wire 98 in needles 21 will cause the needle 21 to heat due to electrical resistance. A high resistance wire 98 will operate effectively to heat the surrounding needle 21 by radiation.

The frame 90 of each carrier 20 is provided with a pair of vertical projections 90a which are formed integrally with the frame body and which are located adjacent the outer edges of the frame 90. Each of these projections 90a extends oppositely to the extension of the needle supports 96. The projections 90a rotatably support the guide rollers which angularly position the carriers 20 relative to the operating conveyor framework 87. Mounted on each of the projections 90a is a lower inside roller 108, an outer roller 110 and an elevated outside roller 111. The two outside rollers 110 and 111 have axes which are aligned in a direction perpendicular to the extension of the needles 21. The elevation of the two lower rollers 108 and 110 is the same and is such that while these rollers are resting on a track support the needle 21 will be positioned parallel to that track support. The extension of the slot 94 at each side of the frame 90 is such that the abutting pin 95 mounted therein will strike the end of the slot 94 when the needles 21 have attained this paralled position. The weight of the rollers 108, 110 and 111, plus the weight of the posts 103 and 104, overbalance the forward weight of the needles 21 and needle supports 96 so that the carrier 20 has a tendency to revolve about the axis of the shaft 91 in a counterclockwise direction as viewed in FIGURE 15. This unbalance is utilized to properly position the carrier for movement with the needles 21 in a position parallel to the supporting track. As seen in FIGURE 15, this position of the needles 21 is attained by allowing the frame 90 to pivot back in a counterclockwise direction until the lower outside rollers 110 rest upon a suitable track support. Other positions attained by the carriers 20 will be described when appropriate in relation to the conveyor assembly 18.

*Hopper Apparatus and Operation*

Located directly below the upper horizontal portion 82c of the pan 82 is the loading hopper 17. The function of this hopper 17 is to position the frozen cylindrical forms 10 while they are being impaled upon the needles 21 of the moving carriers 20, carried by the operating conveyor 18. The hopper 17 must position the cylinders 10 in pairs since the carriers 20 are each provided with two adjacent needles 21. The hopper structure consists of a vertical front wall 112 which extends directly downward from the floor of the pan portion 82c. The materials of this construction can best be seen in FIGURES 17 to 20. The hopper 17 comprises two adjacent chambers, each of which is a mirror image of the other. For this reason only a single chamber will be described and identical numerals will be used to designate identical corresponding parts of the two chambers as shown in the drawings. The hopper apparatus includes a lower chamber 113 in which the cylinders 10 rest during the positioning of the cylinders on the needles 21. The chamber 113 is defined by lower curved walls 114 which extend vertically upward to the floor of the pan portion 82c. The spacing between the two curved walls 114 is sufficient to allow the movement of the cylinders 10 as they drop downward toward the restricted lower portion which is formed by the lower curvature of the two walls 114. The walls 114 are separated at their lower end to provide a slot 115 through which the roller supports 90a of the carriers 20 may pass. The separation between the two slots 115 of the loading hopper 17 is identical to the separation between the two roller supports 90a on each carrier 20. The fixed portion of the loading hopper 17 is completed by a vertical back wall 116. This wall 116 extends only partially downward from the floor of the pan portion 82c and does not restrict the lower portion of the lower chamber 113.

The frozen cylinders 10 are pushed along the floor of the upper horizontal portion 82c of the pan 82 by the plates 85 of the transfer conveyor 16. The portion 82c is provided with a pair of transverse apertures 89 which are sufficiently large to freely receive these cylinders 10 as they roll along the portion 82c. Since the cylinders will first reach the aperture 89, shown at the left in FIGURE 19, provision must be made to carry alternate cylinders 10 across this aperture 89. This is accomplished by means of a gate 137 which is pivoted to the pan 82 and which is adapted to substantially cover the left aperture 89 when in the position shown in dashed lines in FIGURE 19. When in the position shown in full lines in FIGURE 19 the gate 137 blocks further passage of the cylinders 10 along the pan 82.

Figure 19:
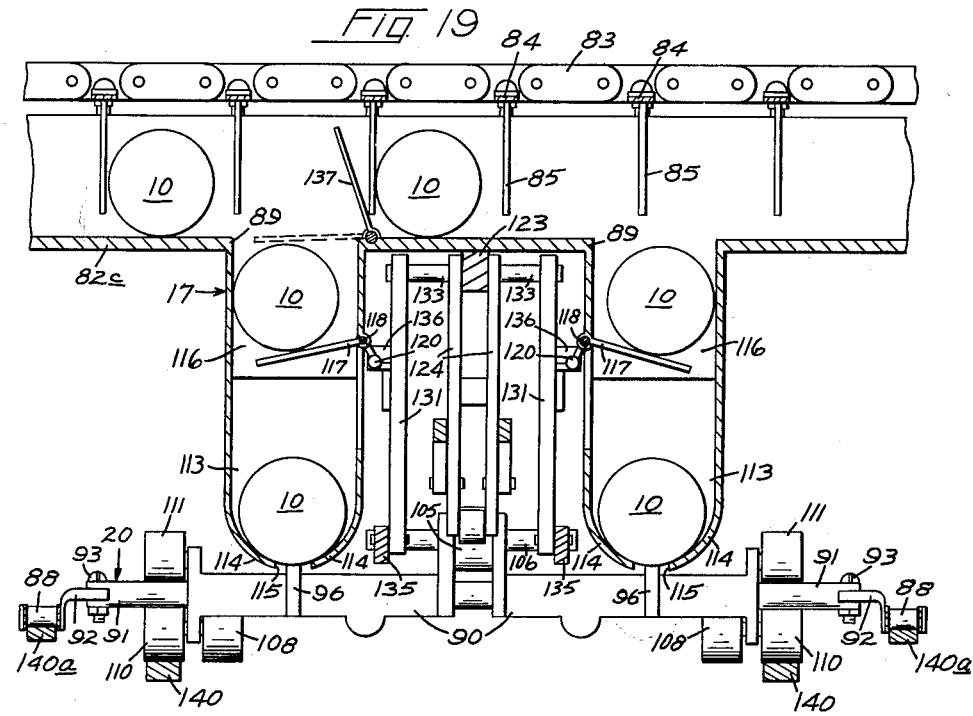
FIGURE 19 is a sectional view taken through the hopper apparatus along line 19—19 in FIGURE 17 with the frozen forms being shown in place.
Figure 20:
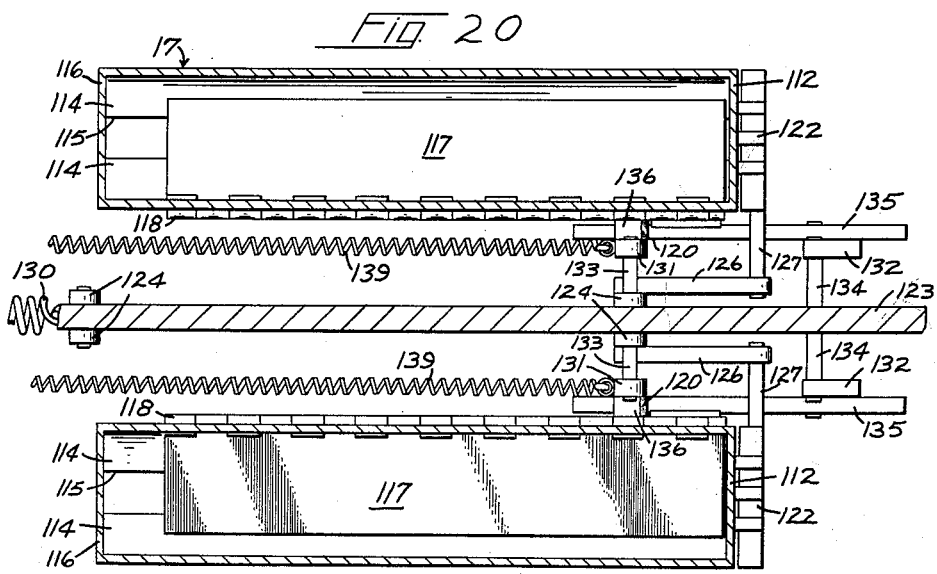
FIGURE 20 is a sectional view through the hopper apparatus taken along line 20—20 in FIGURE 18.

The gate 137 is spring biased by a conventional hinge to the horizontal position shown in dashed lines in FIGURE 19. Fixed rotationally with the gate 137 is an operating lever 138 which can be seen in FIGURE 18. The lever 138 is positioned so as to contact the actuating screws 86 mounted along the transfer conveyor 16. The actuating screws 86 are positioned adjacent alternate cross members 84 mounted between the side chains 83 of the transfer conveyor 16. Thus the lever 138 will be contacted as each alternate cross member 84 crosses the first open aperture 89. In this manner the gate 137 will be periodically raised to the full line position shown in FIGURE 19, thereby allowing alternate cylinders to fall through the first or left hand aperture 89, shown in FIGURE 19. The remaining cylinders 10 will pass over the horizontally positioned gate 137 and will fall through the open right hand aperture 89, as seen in FIGURE 19. Thus a constant supply of frozen cylinders 10 will be furnished to each compartment of the loading hopper 17.

In order to assure the proper positioning of the two cylinders 10 above the curved walls 114 in position for loading upon a carrier 20 the two hopper chambers are furnished with sufficient depth to hold two frozen cylinders 10 at one time. The upper cylinder 10 is normally positioned on a horizontal gate 117 pivotally mounted on the inner wall 114 above the position of the lower frozen cylinder 10. The gates 117 are mounted by spring biased hinges 118 which normally position the gates 117 in a position shown in FIGURE 19. The gate 117 in each compartment is controlled by a separate lever 120 which is formed integrally therewith. Pivotal motion of the lever 120 about the axis of hinge 118 will therefore move the gate 117 to a vertical position in alignment with the wall 114 which is suitably apertured to provide clearance for the swinging gate 117. In order to prevent longitudinal movement of the lowermost forms 10 during impalement upon the needles 21, it is necessary to block the front end of the chambers 113. This is accomplished by use of a front gate 121 pivotally connected to the front wall 112 at its lowest edge. The front gate 121 is mounted on a front wall 112 by means of a horizontal transverse hinge 122. The front gate 121 of each compartment of the loading hopper 17 is movable between a first position wherein it is in a vertical plane and blocking the interior of the lower chamber 113 and a second position shown in FIGURE 17, wherein the gate 121 has been moved upwardly to provide clearance for longitudinal movement of the form 10.

The positioning of the horizontal gates 117 and the front gates 121 is accomplished by means of two parallelogram linkages associated with each side of the loading hopper 17. Mounted between the two compartments of the loading hopper 17 is an upper longitudinal support bar 123. The bar 123 is fixedly secured to the lower surface of the pan 82. The bar 123 pivotally supports two pairs of vertical links 124 which are mounted parallel to one another and which are pivotally connected at their upper ends to the bar 123. The lower ends of the links 124 are pivotally connected to a center bar 125 to complete the parallelogram linkage. Pivotally connected to the forward link 124 is a connecting link 126 which has its outer end pivotally connected to a transverse rod 127. The rod 127 is hinged to the outer surface of the adjacent front gate 121. Thus movement of the parallelogram linkage comprising elements 123 through 125 will result in pivotal movement of the gates 121 to the position shown in FIGURE 17. In order to bias the position of the gates 121 to a closed vertical position, the parallelogram linkage is connected by a tension spring 130 to the operating conveyor framework 87. The spring 130 is connected at its forward end to an anchor block 128 secured between the two rear links 124. The rear end of the spring 130 is secured directly to an element of the operating conveyor framework 87.

Movement of the horizontal gate 117 in each proper compartment is controlled by an adjacent parallelogram linkage. This linkage comprises rear vertical links 131 which are pivotally connected to rear pivot rods 133 mounted on the bar 123. It also includes forward vertical links 132 which are bent so as to provide clearance for movement of the rod 127. The forward links 132 are pivotally mounted on forward rods 134 which also are secured to the bar 123. The lower ends of the links 131—132 are connected to a horizontal bar 135. The ends of bar 135 are tapered so as to allow engagement of the bar with the operating member by which it is controlled. Mounted on the outer surfaces of the rear links 131 are cams 136 which constitute inclines. Each of the cams 136 is designed to contact the lever 120 of the adjacent horizontal gate 117 so as to move the gate 117 to a vertical position when the rear link 131 is moved about its upper pivotal axis to the second position shown in dashed lines in FIGURE 17. The two parallelogram linkages are biased to a rear position shown in full lines in FIGURE 17 by means of tension springs 139 which are connected directly between the operating conveyor framework 87 and the rear links 131.

The operation of the gates 117 and 121 is controlled entirely by movement of the carriers 20 beneath the loading hoppers 17. This can be seen in FIGURES 17 and 18. As a carrier 20 passes under the loading hopper 17 the hopper will initially be in a closed position—that is, the horizontal gate 117 will be in the upper position shown in FIGURE 19 and the front gate 121 will be in a vertical position against the walls 114. Thus the frozen cylinders 10 contained therein will be restricted from longitudinal movement in a forward direction. The needles 21 will then pierce the rear end of the two frozen cylinders 10 and will continue to do so until the front gates 121 are released to the position shown in full lines in FIGURE 17. This will be accomplished when the central roller 105 of the carrier 20 lifts the rear end of the bar 125 to thereby move the central parallelogram assembly and open the two front gates 121. At this time impalement of the frozen cylinders 10 on the needles 21 will be complete. The time of opening the gates 121 will therefore depend upon the length of the bar 125 which may be adjusted, depending upon the length of the cylinders 10 being processed. It is desirable that the lower chamber 113 not receive another cylinder 10 until the one being loaded has fully passed the front wall 112 of the loading hopper 17. Thus the horizontal gates 117 must remain in their upper positions until such passage is complete. At this time the bar 135 adjacent each side of the hopper 17 will be lifted by contact with the roller 105 on supporting shaft 106 mounted centrally on the carrier 20. This roller will abut the tapered rear end of the bar 135 and lift it to the dashed line position shown in FIGURE 17. The interaction of the cams 136 and levers 120 will therefore swing the horizontal gates 117 to a vertical position and allow the succeeding cylindrical forms 10 to fall within the lower chamber 13 till they rest on the curved walls 114. On passage of the shaft 106 past the forward ends of the bars 135, the gates 117 will be allowed to return to their normal position as shown in FIGURE 19. Thus the speed of the operating conveyor 18 must be such that two cylinders 10 will be received on the needles 21 of a carrier 20 during the time in which two successive cylinders 10 are loaded into the hopper 17 by the transfer conveyor 16. Again this timing may be essentially controlled by conventional motor controls so that the conveyors will operate in a specific timed sequence. The operating conveyor 18 is provided with forward sprockets 141, rotatably mounted about a transverse axis on the conveyor framework 87. The forward sprockets 141 entrain the two chains 88 which ride along upper tracks 140a. A pair of roller supporting tracks 140 is fixed to the conveyor frame 87 between the tracks 140a. Tracks 140 and 140a are parallel, the tracks 140 being utilized to support the lower outside rollers 110 on the carriers 20 so as to maintain the needles 21 in a horizontal position along the upper flight of the conveyor 18. The front sprockets 141 are rotated by means of a driving sprocket 142 which is powered by a motor 144 by means of a drive chain 143. See FIGURES 9 and 12.

*Chocolate Dipping Apparatus*

The dipping apparatus utilized in this machine can best be seen in FIGURES 12, 21 and 23. In order to assure complete dipping of the impaled cylinders 10 while carried on the individual carrier 20, it is necessary to orient the cylinders 10 so that they enter the dipping tank 22 in a substantially axial direction. This alleviates the danger of cylinders 10 breaking off beyond the ends of the needles 21 due to the surface resistance of the chocolate within the tank 22. The means by which this is accomplished includes the downwardly curved extension 145 at the end of the upper track 140 along each side of the operating conveyor 18. These extensions 145 carry the outer lower rollers 110 in the same manner as does the remainder of the tracks 140. The carriers 20 are prevented from moving from a position parallel to the track portion 145 by the abutment of the pins 95 on pivot shaft 91 against the end of the respective slot 94 within which it is mounted. Thus the carrier 20 as it moves down the portion 145 will retain the position shown in FIGURE 23. After being released from the track portions 145 the carrier is then positioned by means of a central track 146 mounted on the fixed frame 87. This central track 146 contacts the central roller 105. The track 146 converges toward the straight locus of chains 88 below the forward sprockets 141. Thus the carrier 20 will be gradually tilted in a counterclockwise direction as shown by the intermediate position illustrated in dashed lines in FIGURE 23. As the central roller 105 reaches the lowermost end of the track 146, it will be released but the carrier 20 will immediately be caught by the front end portion 155 of a second pair of tracks 154 which extend along the lower flight of the chains 88. The racks 154 will thus be engaged by the two outside rollers 110 and 111 whose axes are aligned perpendicularly to the needles 21 on each carrier 20. This will cause the cylinder 10 to be tilted upwardly from the tank 22 in a quite rapid motion as illustrated by the intermediate positions shown in dashed lines in FIGURE 23. The carrier 20 will then ride perpendicularly to lower tracks 154 and will be carried in this position along the entire length thereof. Thus the dipping action, as illustrated in FIGURES 21 and 23, is quite fast and permits the cylindrical forms 10 to be immersed with a minimum of danger of the forms breaking off from the needle 21. The intermediate portions of the chains 88 are suitably supported by idler sprockets 149a and 149b so as to insure the formation of horizontal upper and lower flights along the operating conveyor 18.

The dipping tank 22 is a rectangular structure having an overflow tank 147 at the rear end thereof. The tank 22 is supplied with chocolate heated to the correct temperature in a large supply vat 23. The chocolate is brought to tank 22 by an inlet pipe 148 which opens to the floor of the tank 22. An outlet 150 at the bottom of the overflow tank 147 is connected to the inlet of the suitable pump 151 which is driven by a motor 152. The excess chocolate which has flowed into the overflow tank 147 is returned to vat 23 by means of a return pipe 153. The entire chocolate system is a continuously circulating network by which chocolate is maintained in the tank 22 at the exact temperature desired for proper dipping of the cylindrical forms 10 in the time permitted by the dipping action of the conveyor and conveyor framework interrelated with the carriers 20.

*Crumber Apparatus*

The freshly dipped cylindrical forms 10 travel along the lower flight of the operating conveyor 18 a short distance until they enter the crumber 24. This crumber 24 is an enclosure having a top wall 157, vertical side walls 158 and end walls 160 and 161. The crumber 24 is rigidly mounted on a framework 87 and is located directly below the lower flight of the chains 88 adjacent the forward edge of the transfer conveyor 16. The top wall 157 is provided with a pair of longitudinal parallel slots 162 which are bounded by sealing strips 163. The slot 162 is designed to receive the top portions of the needle 21 and to seal off the interior of the crumber 24 from the remainder of the operating conveyor 18. The end walls 160 and 161 are provided with large apertures 164 which are covered by overflow pans 165. The pans 165 have vertical dividing walls 172 which form apertures for the reception of the frozen cylinders 10. The interior of a pan 165 can be seen in FIGURE 28. It has a sloping bottom wall 165a designed to catch the chocolate and crumbs which may fall from the passing cylinders 10. An outer side wall 158, which is shown in FIGURE 24, is provided with a manually operable slide opening 166 so that a person may view the interior of the crumber 24. Crumbs are supplied from a hopper 25 mounted on the framework 87 by means of a chute 167 which extends to the interior of the crumber 24. A vibrator unit 168 mounted on the bottom wall of the chute 167, insures continuous movement of the crumbs from the hopper 25 to the crumber 24.

In operation the crumber is designed to provide an atmosphere of projected particles which are maintained in continuous motion so as to fully coat the freshly dipped cylinders 10 as they pass between the end walls 160 and 161. This is accomplished by means of a flexible bottom wall 170 which is formed of cloth or other suitable curtain material. The bottom wall 170 is supported in four quadrants by dividing strips 171. The strips 171 are mounted by peripheral angle irons 173. A transverse frame support 174 extends across the center of the crumber 24. A central vertical bar 175 is fixed to the transverse frame support 174 and extends upwardly to a location adjacent the center of dividing strips 171. Mounted at the top end of bar 175 is a bracket 176 which pivotally mounts the inner ends of four beater arms 177. The outer ends of these beater arms 177 are provided with pivoted beater plates 186 located on the top surfaces thereof. The beater plates 186 are in proximity to the lower surface of the bottom wall 170 intermediate the dividing strips 171. Mounted on the lower surface of the support 174 is a plate 180. The plate 180 supports spring abutments 181 located directly below each of the beater arms 177. Extending between the abutments 181 and the beater arms 177 are individual compression springs 182. The springs 182 therefore urge the beater arms 177 upwardly about their pivotal connections to the bracket 176. Mounted about the periphery of the plate 180 are four bearing blocks 183 which have vertical apertures through which are received individual slide bars 184 located directly below each beater arm 177. The upper ends of the slide bar 184 are respectively connected to the beater arms 177 about horizontal axes. The lower end of the slide bars 184 are provided with rollers mounted for movement about horizontal axes and positioned adjacent the inner surface of each bar 184. The upper surfaces of the rollers 187 are contacted by a cam plate 188 having two inclined cams 190 formed on its lower surface. The inclined cams 190 are designed to pull the rollers 187 and bar 184 downwardly as the plate 188 is rotated. The plate 188 is turned by means of a driving shaft 191 driven directly from a transmission 192 and motor 193. Thus as the motor 193 revolves the plate 188, the beater arms 177 will be progressively pulled downwardly from the wall 170 and then released to spring upwardly against the wall 170 due to the action of the springs 182. This successive beating of the wall 170 will propel the crumbs within the interior of the the freshly dipped forms 10 move through the crumber crumber 24 upwardly in a random fashion so as to provide an atmosphere filled with flying crumbs. Thus as 24 the particles will adhere to their surfaces and thereby complete the formation of the frozen confection logs.

*Final Processing Steps*

By the time that the cylinders have passed through the crumber 24 the chocolate on the frozen cylindrical forms 10 will be quite hard, due to the low temperature of the forms 10. Shortly after exiting from the crumber 24 the carriers 20 will pass beneath fixed electrodes 26 mounted directly above the lower flights of the chains 88 and centrally positioned with respect to the operating conveyor 18. These electrodes 26 comprise a pair of lower conducting strips 194 which are positioned so as to respectively contact the two posts 103—104 on each carrier 20. The length of the electrodes 26 determines the time of contact between these elements. The length must be chosen so that the current conducted through the posts 103—104 will heat the needles 21 to a temperature sufficient to insure the release of the forms 10 from the needles 21. As seen in FIGURE 24, the electrodes 26 are positioned directly above the receiving portion 195 of a suitable bagging machine generally designated by the numeral 27. Thus as the carrier 20 passes across the receiving portion 195, the strips 124 will heat the needles 21 to thereby release the forms 10. This heating action is quite fast, particularly when the needles 21 are formed of stainless steel. Upon release in this manner the forms 10 will be slightly melted adjacent the area impaled by the needles 21. This melting action will be only momentary since this portion of the forms 10 will again be frozen due to the temperature of the remaining frozen structure surrounding it. In this way the form as finally produced will be a solid structure with no appreciable hole formed through its central axis.

As shown in FIGURE 30, suitable protection means is provided to insure that the machine will not be damaged should a form 10 remain on one of the needles 21 after passing the conducting strips 124. The stripper 28 comprises a bent plate 196 which extends rearwardly at an upwardly directed angle from a fixed support 197 secured to frame 87. Plate 196 includes a pair of longitudinal slots 198 designed to receive needles 21 only. Thus should a form 10 remain on one of the needles 21 it will contact the plate 196 adjacent that needle 21 and the relative movement of the needle 21 and fixed plate 196 will cause the form 10 to drop to the floor.

After passing the electrodes 26 and being relieved of their forms 10 the needles 21 are preferably washed so as to eliminate the accumulation of ice cream on needles 21. The needles 21 pass through an enclosure 200 which forms the washing apparatus 30. The enclosure 200 is suitably slotted at 201 along its entire sides so as to allow the needles 21 to pass through its interior. The enclosure 200 is provided with supply pipes 202 through which hot water or steam is injected within the enclosure 200. A suitable drain 199 is provided to carry off surplus water.

In order to reorient the needles for subsequent passage along the upper flights of the chains 88, it is necessary to provide a cam action at the rear end of the conveyor 18. The apparatus by which this is obtained can best be seen in FIGURE 31. As the rollers 110 and 111 leave the rear end of the tracks 154, the inside rollers 108 are contacted by the fixed intermediate tracks 206. The upper surface of each track 206 angles toward the locus of the chain 88 as it passes along the end sprocket 203 on which it is entrained. Thus the natural balancing of the carrier 20 will tend to hold the rollers 108 against the upper surfaces of the two tracks 206. In this manner the carrier 20 will be swung to the intermediate position shown in dashed lines in FIGURE 31. When the carrier 20 attains a position tangent to the sprockets 203 the rollers 110 will contact the rear ends 204 of the upper tracks 140 and the weight of the carrier 20 will rest on the two outer rollers 110 and thereby maintain the carrier 20 in a horizontal position as it travels forwardly along the top flight of the operating conveyor 18. The carrier 20 then returns to the hopper 17 and the entire process is repeated on a continuous basis.

*Operation of the Machine*

In general the operation of this integrated machine should be obvious from the detailed description of the individual operations related above. The flow of material is continuous from the raw products to the final wrapped product. The extruded semi-solid material is first cut by the cutting apparatus 14 and is then frozen as it traverses the freezing tunnel 15 and is then transferred by the transfer conveyor 16 to the loading hopper 17. The impalement of the forms 10 by the needles 21 of the carriers 20 has been adequately described in the description of the hopper apparatus. The forms 10 are sufficiently cooled so as to carry out all the processes on the operating conveyor 18 without melting. The dipping action at tank 22 is very quick since a slow movement of the forms 10 through the tank 22 would result in a coating having a greater thickness than that desired. This action is controlled by the tracks which co-act with rollers 105, 108, 110 and 111 to produce the desired action as illustrated and described above. The forms 10 are immediately carried through the crumber 24 where the still semi-liquid chocolate coating is used to adhere the particles in the crumber atmosphere to the forms to complete the confection product.

After the coating steps have been completed the forms 10 are allowed sufficient time to completely harden due to their interior low temperatures. The forms 10 are then released by heating the needles 21 along the two conducting strips 124. The forms then fall into a bagging machine 27 which may place them in sacks or coat them with a suitable sealed covering for consumer purchase. These needles then carry through the washing apparatus 30 which cleans the areas of carriers 20 which contact these frozen forms 10. The rear end of the conveyor 18 resets the needles 21 to their horizontal positions desired on the upper flights of the chains 88. Thus the needles 21 are positioned in a horizontal orientation along the upper flight of the conveyor 18 while the needles are positioned perpendicularly to the horizontal along the lower flight of the chains 88.

Many modifications are possible without deviating from the general scope of the invention as described above. Many of the components may be altered or substituted for equivalent components. For instance, if a coated product is desired without particles on its exterior, the crumber 24 may be completely eliminated. Should the final product be of a different form other than a cylinder, the formation of the die tubes 38 may obviously be altered. In general the overall scheme of operation is that found most desirable while other modifications will obviously present themselves to those skilled in this field. For these reasons only the following claims are intended to define my invention.

Having thus disclosed by invention, I claim:

1. In a machine for producing frozen confections:
    a rigid framework;
    an operating conveyor supported by said framework, said operating conveyor having a plurality of carriers spaced along the length thereof and interrelated with said conveyor so as to define the angular relationship of said carriers relative to said framework;
    a plurality of outwardly extending needles fixed at their inner ends to each of said carriers in transversely spaced parallel positions longitudinally aligned with the respective needles of the remaining carriers, said conveyor including a horizontal upper flight over which said needles are maintained in a horizontal position extending outwardly in the direction of travel of said operating conveyor;
    a plurality of hoppers fixed to said framework above said operating framework, each including a loading chamber in longitudinal alignment with the needles adapted to restrict movement of objects within the loading chamber while the objects are being impaled on the needles by movement of said operating conveyor, said chambers being situated on said framework in such positions that the center of the objects held therein are axially aligned with said needles, the bottom walls of said chambers being longitudinally slotted to receive the needles and the mounting brackets therefor;
    gate means covering the end of each chamber last encountered by the moving carriers;
    biasing means connected to said gate and to said framework adapted to urge said gate means to a closed position;
    and means on said carriers operatively engageable with said gate means adapted to release said gate means when engaged therewith during passage of each carrier beneath said hoppers.

2. The apparatus defined in claim 1 further including a panel mounted within each hopper directly above the chambers thereof, each of said panels being movable between a first position wherein it blocks downward motion of forms through said hopper and into said chambers, and a second position wherein such movement is unrestricted;
    means operatively connected to said panels biasing them to the first of said positions;
    and means on said carriage operatively engageable with said panels adapted to move said panels to the second said position when engaged therewith during passage of each carrier beneath said hopper.

3. In a machine for making frozen confections, having a fixed framework and an operating conveyor having a horizontal flight, said operating conveyor having means thereon adapted to support freshly dipped objects in a downwardly extending position while traveling along said horizontal flight, a crumber apparatus comprising:
    an enclosure adapted to be fixed relative to the framework at a location below the horizontal flight of the conveyor, said enclosure having a longitudinally slotted top wall adapted to receive the supports for the objects as each object passes through the enclosure, the longitudinal ends of the enclosure being slotted adjacent the top edges thereof so as to provide clearance for reception of the freshly dipped objects;
    a flexible bottom wall mounted within said enclosure in a horizontal position, said wall being supported in quadrants by rigid dividers fixed to the enclosure;
    beater arms pivotally mounted on said framework below said bottom wall for motion in a vertical plane, the outer ends of said arms being located respectively within the divided areas of said bottom wall and being movable into contact therewith;

springs connected between each of said beater arms and said framework adapted to urge said beater arms into contact upwardlly against said bottom wall;

and operating means mounted on said framework operatively connected to said beater arms adapted to successively move said beater arms against the biasing springs and to then release the respective arms to thereby allow the beater arms to strike the bottom wall of the enclosure.

4. A crumber apparatus as defined in claim 3 wherein said beater arms are pivotally mounted about horizontal axes adjacent the center of said bottom wall;

said operating means comprising individual downwardly depending levers pivotally connected at their upper ends to said beater arms and each having a roller mounted at its lower end about horizontal axes, the rollers being faced toward one another, the levers being slidably supported by said framework for motion in a vertical direction;

said operating means further comprising a cam rotatably journalled by said framework for motion about a central vertical axis, said cam including inclined faces adapted to engage the top surfaces of said rollers to thereby effect vertical motion of said levers;

and drive means connected to said cam adapted to rotate said cam about its axis.

5. In a machine for making frozen confections, an operating conveyor assembly comprising:

a conveyor framework having a movable conveyor chain entrained thereon for translatory movement of the chain relative to said framework, comprising:

a transverse support shaft adapted to be secured to the movable chain so as to be moved in unison therewith;

a rigid carrier frame pivotally mounted on said shaft for limited rotational movement about the axis of said shaft;

an impaling element fixed at one end to said carrier frame and extending outwardly therefrom, said impaling element comprising a hollow rod of small diameter terminating in a sharply pointed outer end, the remaining end of said rod being fixed to the frame;

positioning means mounted on said carrier frame operatively engageable with the conveyor framework adapted to angularly position said frame about the axis of said shaft relative to the conveyor framework;

an insulated conducting element extending within said hollow rod and electrically connected to the pointed outer end thereof;

a pair of contact posts mounted on said frame adapted to slidably contact fixed conductors mounted on the conveyor framework;

a first electrical connection wired between said insulated conducting element and a first of said pair of contact posts;

and a second electrical connection of low resistance material wired between the remaining end of said rod and the remaining one of said pair of contact posts.

6. An apparatus for producing frozen confections, comprising:

a rigid operating conveyor framework;

an open topped tank fixed vertically below said framework;

an operating conveyor mounted on said framework for translational movement along said framework, said operating conveyor including a plurality of longitudinally spaced carriers pivotally mounted about transverse individual axes, each carrier having an impaling element extending outwardly in a plane parallel to the direction of travel of the operating conveyor;

means fixed to said framework directly above said tank and operatively engageable with said carriers adapted to swing said impaling element of each carrier to a vertical downwardly directed position as it passes across the open face of said tank;

an enclosed chamber fixed to said framework adjacent said tank in the direction of travel of said operating conveyor, said operating conveyor being located adjacent one wall of said chamber;

means within said chamber adapted to propel particles within its boundaries in a random fashion;

and means on said framework adjacent said one wall of said chamber adapted to co-act with said carriers to thereby project said impaling elements through a longitudinal slot cut along the length of said one wall.

7. An apparatus for producing frozen confections, comprising:

a rigid operating conveyor framework;

an open topped tank fixed vertically below said framework;

an operating conveyor mounted on said framework for translational movement along said framework, said operating conveyor including a plurality of longitudinally spaced carriers pivotally mounted about transverse individual axes, each carrier having an impaling element extending outwardly in a plane parallel to the direction of travel of the operating conveyor;

means fixed to said framework directly above said tank and operatively engageable with said carriers adapted to swing said impaling element of each carrier to a vertical downwardly directed position as is passes across the open face of said tank;

an enclosed chamber fixed to said framework adjacent said tank in the direction of travel of said operating conveyor, said operating conveyor being located adjacent one wall of said chamber;

means within said chamber adapted to propel particles within its boundaries in a random fashion;

means on said framework adjacent said one wall of said chamber adapted to co-act with said carriers to thereby project said impaling elements through a longitudinal slot cut along the length of said one wall;

and means mounted on said framework for operational contact with said carriers adapted to heat said impaling element of each carrier as the carrier passes thereby.

8. A conveyor comprising:

a rigid supporting framework;

transversely spaced sprockets located at each end of said framework for rotation about longitudinally spaced central transverse axes;

a pair of endless roller chains supported on their undersides by said framework and entrained about said sprockets in identically timed positions, said chains having fixed thereto a plurality of inwardly directed brackets;

a plurality of transverse shafts fixed respectively to each pair of inwardly directed brackets;

a plurality of carrier frames pivotally mounted respectively on each of said shafts for rotational motion about the respective central longitudinal axes of said shafts;

outwardly extending impaling means fixed to said carrier frames to engage said framework to thereby angularly position said carriers relative to their respective transverse shafts;

said impaling means comprising a straight needle having a sharpened outer end, the remaining end of the needle being fixedly secured to the respective carrier;

each of said carrier frames being unbalanced about the axis of its shaft in a position diametrically opposite the needle, the excess of weight being opposite the needle;

said framework having a top track along the upper chain flight located adjacent the lower edge of the chain, said framework further having a lower track vertically aligned with said top track and positioned along the lower chain flight located adjacent the upper edge of the chain;

said guide means comprising a pair of rollers vertically aligned with said top and bottom tracks and mounted on each carrier frame for rotation about transverse axes which are aligned perpendicularly to the needle;

the lowermost of said pair of rollers being adapted to ride along said top track as the needle of the respective carrier frame assumes a horizontal position, the two rollers being adapted to ride along the lower track as the needle of the respective carrier frame assumes a vertical position.

References Cited in the file of this patent

UNITED STATES PATENTS

| | | |
|---|---|---|
| 834,046 | Cave | Oct. 23, 1906 |
| 1,130,377 | Collis | Mar. 2, 1915 |
| 1,893,513 | Balian | Jan. 10, 1933 |
| 2,602,535 | Bird | July 8, 1952 |
| 2,625,120 | Eddy et al. | Jan. 13, 1953 |
| 2,739,545 | Nelson | Mar. 27, 1956 |
| 2,893,332 | Roser et al. | July 7, 1959 |
| 2,957,435 | Anderson | Oct. 25, 1960 |